(12) United States Patent
Casey et al.

(10) Patent No.: US 9,712,420 B2
(45) Date of Patent: Jul. 18, 2017

(54) METHOD AND MEDIUM FOR IMPLICIT RELATIONSHIP DISCOVERY BASED ON CUMULATIVE CO-TEMPORAL ACTIVITY

(71) Applicant: RedVector Networks, Inc., Hayward, CA (US)

(72) Inventors: Tim L. Casey, San Jose, CA (US); Kelvin Chau, Pleasanton, CA (US)

(73) Assignee: RedVector Networks, Inc., Hayward, CA (US)

( * ) Notice: Subject to any disclaimer, the term of this patent is extended or adjusted under 35 U.S.C. 154(b) by 279 days.

(21) Appl. No.: 14/635,139

(22) Filed: Mar. 2, 2015

(65) Prior Publication Data

US 2015/0256635 A1 Sep. 10, 2015

Related U.S. Application Data

(60) Provisional application No. 61/948,476, filed on Mar. 5, 2014.

(51) Int. Cl.
*G06F 15/173* (2006.01)
*H04L 12/26* (2006.01)
*G06F 17/30* (2006.01)

(52) U.S. Cl.
CPC ........ *H04L 43/12* (2013.01); *G06F 17/30539* (2013.01)

(58) Field of Classification Search
None
See application file for complete search history.

(56) References Cited

U.S. PATENT DOCUMENTS

| 6,873,619 | B1* | 3/2005 | Edwards | H04L 41/12 370/392 |
| 7,133,883 | B2* | 11/2006 | Talagala | G06F 17/30958 |
| 8,001,232 | B1* | 8/2011 | Saulpaugh | G06F 9/465 709/203 |
| 9,235,848 | B1* | 1/2016 | Gourley | G06Q 30/0209 |
| 2009/0177420 | A1* | 7/2009 | Fournier | G01R 31/1272 702/59 |
| 2013/0145010 | A1* | 6/2013 | Luna | H04W 40/248 709/223 |

(Continued)

*Primary Examiner* — Umar Cheema
*Assistant Examiner* — John Fan
(74) *Attorney, Agent, or Firm* — Kilpatrick Townsend & Stockton LLP

(57) ABSTRACT

Implied relationships between entities, such as network endpoints, are automatically discovered based on co-temporal events. Events involving pairs of endpoints, such as messaging events in which one endpoint acts as a source and another endpoint acts as a destination, may be detected. Edges between nodes representing those endpoints and other nodes representing other endpoints involved in other recent (co-temporal) events may be added to a progressively constructed graph. Over time, such edges may be progressively weighted in response to the detection of further co-temporal events involving the same endpoints. Relationships between endpoints may be implied based on the resulting accumulated weights of edges linking those endpoints' nodes in the graph even if there is no express relationship between those endpoints in any real-word context (e.g., even if those endpoints are not directly connected in any network, and even if no single event involves both of those endpoints together).

19 Claims, 23 Drawing Sheets

(56) References Cited

U.S. PATENT DOCUMENTS

2014/0114609 A1\* 4/2014 Maurer .............. H03H 21/0016
702/179
2014/0236890 A1\* 8/2014 Vasan ................. H04L 67/1097
707/610

\* cited by examiner

| EP/FC | $a_0$ | $a_1$ | $a_2$ | $a_3$ | $a_4$ | $a_5$ | $a_6$ | $a_7$ | $a_8$ | $a_9$ | $a_{10}$ | $a_{11}$ | $a_{12}$ | $a_{13}$ | $a_{14}$ | $a_{15}$ | $a_{16}$ | - | - | - | - | $a_m$ |
|---|---|---|---|---|---|---|---|---|---|---|---|---|---|---|---|---|---|---|---|---|---|---|
| $a_0$ | 0 | 1 | 0 | 1 | 0 | 1 | 0 | 0 | 1 | 0 | 0 | 1 | 1 | 0 | 1 | 0 | 0 | 0 | 0 | 0 | 0 | 0 |
| $a_1$ | 1 | 0 | 0 | 0 | 1 | 0 | 1 | 0 | 0 | 0 | 1 | 1 | 1 | 0 | 0 | 1 | 0 | 1 | 0 | 1 | 1 | 0 |
| $a_2$ | 0 | 0 | 0 | 0 | 0 | 0 | 0 | 0 | 1 | 0 | 0 | 0 | 0 | 1 | 0 | 1 | 1 | 0 | 0 | 0 | 1 | 1 |
| $a_3$ | 1 | 0 | 0 | 0 | 0 | 1 | 0 | 0 | 0 | 1 | 0 | 0 | 0 | 0 | 0 | 0 | 0 | 0 | 0 | 1 | 0 | 0 |
| $a_4$ | 0 | 1 | 0 | 0 | 0 | 0 | 0 | 1 | 0 | 0 | 0 | 0 | 1 | 0 | 0 | 0 | 0 | 1 | 0 | 0 | 0 | 0 |
| $a_5$ | 1 | 0 | 0 | 1 | 0 | 0 | 0 | 0 | 1 | 1 | 0 | 0 | 0 | 0 | 0 | 1 | 1 | 0 | 0 | 1 | 0 | 1 |
| $a_6$ | 0 | 1 | 0 | 0 | 0 | 0 | 0 | 0 | 0 | 0 | 0 | 1 | 1 | 1 | 1 | 0 | 0 | 0 | 0 | 1 | 0 | 0 |
| $a_7$ | 0 | 0 | 0 | 0 | 1 | 0 | 0 | 0 | 0 | 0 | 1 | 0 | 0 | 0 | 0 | 0 | 0 | 0 | 0 | 0 | 0 | 0 |
| $a_8$ | 0 | 0 | 1 | 0 | 0 | 1 | 0 | 0 | 0 | 0 | 0 | 1 | 1 | 0 | 0 | 0 | 1 | 0 | 0 | 1 | 1 | 0 |
| $a_9$ | 1 | 0 | 0 | 1 | 0 | 1 | 0 | 0 | 0 | 0 | 0 | 0 | 0 | 1 | 1 | 0 | 0 | 0 | 0 | 0 | 0 | 1 |
| $a_{10}$ | 0 | 1 | 0 | 0 | 0 | 0 | 0 | 1 | 0 | 0 | 0 | 0 | 1 | 0 | 0 | 0 | 1 | 0 | 0 | 1 | 0 | 0 |
| $a_{11}$ | 0 | 1 | 0 | 0 | 0 | 0 | 1 | 0 | 1 | 0 | 0 | 0 | 0 | 0 | 0 | 0 | 0 | 0 | 0 | 0 | 0 | 0 |
| $a_{12}$ | 1 | 1 | 0 | 0 | 1 | 0 | 1 | 0 | 1 | 0 | 1 | 0 | 0 | 1 | 1 | 0 | 1 | 0 | 0 | 0 | 0 | 1 |
| $a_{13}$ | 1 | 0 | 1 | 0 | 0 | 0 | 1 | 0 | 0 | 1 | 0 | 0 | 1 | 0 | 0 | 0 | 0 | 0 | 0 | 0 | 0 | 0 |
| $a_{14}$ | 0 | 0 | 0 | 0 | 0 | 0 | 1 | 0 | 0 | 1 | 0 | 0 | 1 | 0 | 0 | 0 | 0 | 1 | 0 | 0 | 0 | 0 |
| $a_{15}$ | 1 | 1 | 1 | 0 | 0 | 1 | 0 | 0 | 0 | 0 | 0 | 0 | 0 | 0 | 0 | 0 | 0 | 0 | 0 | 0 | 1 | 0 |
| $a_{16}$ | 0 | 0 | 1 | 0 | 0 | 1 | 0 | 0 | 1 | 0 | 1 | 0 | 1 | 0 | 0 | 0 | 0 | 0 | 1 | 0 | 0 | 1 |
| - | 0 | 1 | 0 | 0 | 1 | 0 | 0 | 0 | 0 | 0 | 0 | 0 | 0 | 0 | 0 | 0 | 0 | 0 | 1 | 0 | 0 | 0 |
| - | 0 | 0 | 0 | 0 | 0 | 0 | 0 | 0 | 0 | 0 | 0 | 0 | 0 | 1 | 0 | 1 | 0 | 0 | 0 | 0 | 0 | 1 |
| - | 0 | 1 | 0 | 1 | 0 | 1 | 1 | 0 | 1 | 0 | 1 | 0 | 0 | 0 | 0 | 0 | 1 | 0 | 0 | 0 | 0 | 0 |
| - | 0 | 1 | 1 | 0 | 0 | 0 | 0 | 1 | 0 | 0 | 0 | 0 | 0 | 1 | 0 | 0 | 0 | 0 | 0 | 0 | 0 | 1 |
| $a_m$ | 0 | 0 | 1 | 0 | 0 | 1 | 0 | 0 | 0 | 1 | 0 | 1 | 0 | 0 | 0 | 1 | 0 | 1 | 0 | 1 | 0 | 0 |

METHOD AND MEDIUM FOR IMPLICIT RELATIONSHIP DISCOVERY BASED ON CUMULATIVE CO-TEMPORAL ACTIVITY

CROSS REFERENCE TO RELATED APPLICATION

This application claims benefit under 35 USC 119(e) of U.S. provisional patent application Ser. No. 61/948,476 filed Mar. 5, 2014, the contents of which is incorporated herein by reference in its entirety.

BACKGROUND OF THE INVENTION

Embodiments of the invention pertain to the field of data analysis generally, and more specifically to the automated discovery of implied relationships between entities based on events over time. In investigative endeavors, such those often occurring in law enforcement or other security fields, it is often helpful to determine relationships between entities. Such entities might be people, for example. If one person is a suspect in a crime, then determining other people who are related to that person in some way might help investigators to obtain more information about the crime or the suspected person. Such other people might be able to provide that information if questioned. Such other people might, themselves, be involved in the crime. Sometimes, relationships are express. For example, if a man has a brother, then that man and his brother are involved in an express familial relationship. If a man works in the same office as another man, then those man are involved in an express employment-based relationship.

Those who are involved in crimes or other misbehavior often actively seek to conceal their relationships to others who might be able to provide information about them or their activities. Two or more people who conspire to commit a crime, such as an act of terrorism, for example, might not have any express relationship that is easily determinable. Co-conspirators might never meet with or communicate directly with each other. Co-conspirators might not even know each other's identities in some cases. Under such circumstances, investigators might be hampered by a lack of express relationships on which to base their investigative efforts.

BRIEF SUMMARY OF THE INVENTION

According to the invention, implied relationships between entities are discovered based on temporal events associated with each entity, the temporal events being represented by data generated and stored by a data processing machine. Such entities may be endpoints within a computer network, for example. Each endpoint may be characterized by a different Internet Protocol (IP) address, MAC address or email address. Events involving pairs of endpoints, such as messaging events in which one endpoint acts as a source and another endpoint acts as a destination, can be detected. In response to detecting such events, a data processing machine generates data specifying edges between nodes representing those endpoints, and other nodes representing other endpoints involved in other recent (co-temporal) events may be added to a progressively constructed graph. Over time, such edges may be progressively weighted in response to the detection of further co-temporal events involving the same endpoints. Relationships between endpoints may be implied based on the resulting accumulated weights of edges linking those endpoints' nodes in the graph even if there is no express or immediately evident relationship between those endpoints in any real-word context (e.g., even if those endpoints are not directly connected in any network, and even if no single event involves both of those endpoints together).

Implied relationships discovered according to the invention may be used for a variety of purposes. For example, in a law enforcement context, if a machine associated with a first endpoint is misbehaving, then the discovery of an implied relationship between the first endpoint and a second endpoint may give investigators cause to pursue the investigation of a machine associated with the second endpoint as well. The discovery of such implied relationships may be useful in combatting terrorism, for example.

According to a technique according to the invention, data representing events involving pairs of endpoints are categorized and sorted according to temporal "buckets" each having a specified temporal duration. For example, each bucket may be a minute long. An event occurring during a particular minute is allocated to the bucket corresponding to that particular minute. A sliding temporal "window" has a temporal duration measured in a specified quantity of buckets. For example, the sliding window may be ten buckets long, which is ten minutes long if each bucket corresponds to one minute. The sliding window moves temporally along by one-bucket intervals, so that the sliding window includes different overlapping sets of buckets at different moments in time. Events occurring within buckets that are contained in the same sliding window are co-temporal with each other. Each time that the sliding window moves, weights for graph edges in between endpoint pairs involved in events contained in buckets then falling inside the same sliding window (which are therefore co-temporal) are incremented.

The invention will be better understood by reference to the following detailed description in connection with the accompanying drawings.

BRIEF DESCRIPTION OF THE DRAWINGS

FIG. 11 is a diagram illustrating an example of a bi-valued matrix storing binary values representing the presence or absence of co-temporal activity for multiple endpoint pairs during a particular time period, according to an embodiment of the invention.

FIG. 17 is a diagram illustrating an example of a co-temporal co-efficient matrix for a particular time period, according to an embodiment of the invention.

DETAILED DESCRIPTION OF SPECIFIC EMBODIMENTS OF THE INVENTION

FIGS. 1A-E collectively illustrate a flow diagram showing an example of a technique for automatically discovering implied relationships, according to an embodiment of the invention as would be implemented on a data processing device. In one embodiment, a computer system performs the technique relative to event data that has been recorded over some period of time, or that is currently being recorded or observed. Thus, in one embodiment, the technique discussed below may be performed in real-time, as the events relative to which the technique is performed are occurring. Under circumstances in which the events are e-mail transactions, such event data may be acquired from logs obtained from an e-mail server. In one embodiment, each event in the event data is a tuple that possesses at least the following attributes: a source, a destination, and a time. For example, if an event corresponds to a message transaction, then the source might be a source endpoint at which a message originated, the destination might be a destination endpoint to which that message ultimately was to be delivered, and the time might be the time at which the source endpoint sent the message. The endpoints may be identified by IP address, MAC address or email address or the like.

Figure 1A:
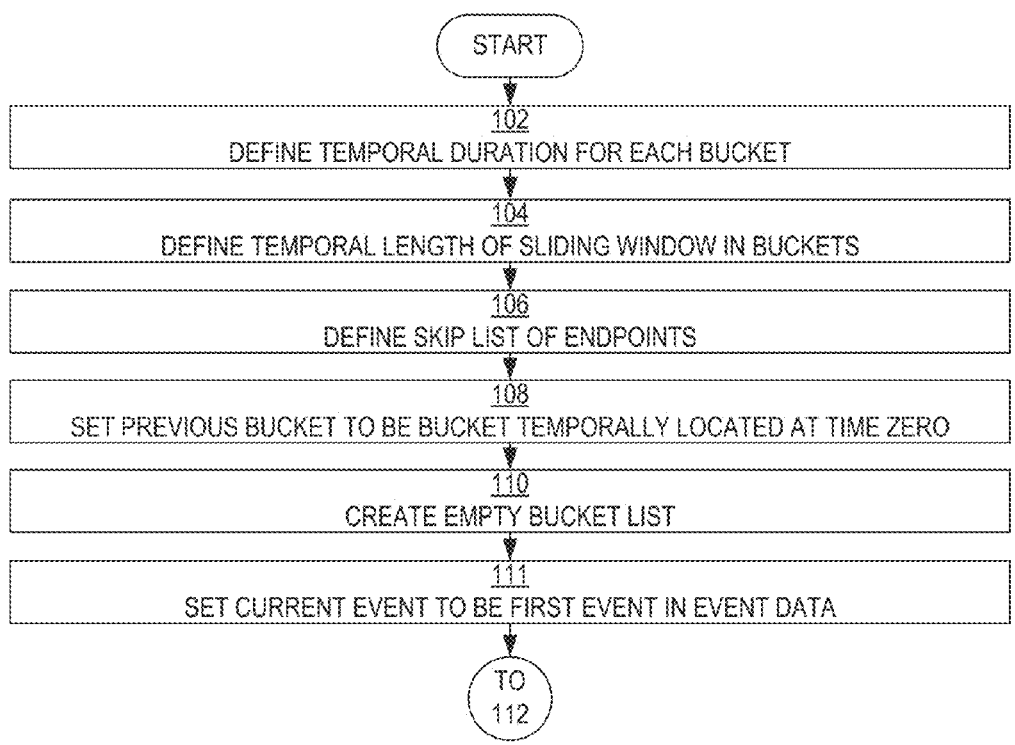
FIGS. 1A-E collectively illustrate a flow diagram of an executable computer program showing an example of a technique for automatically discovering implied relationships according to one embodiment of the invention.

Referring first to FIG. 1A, in block 102, a computer system defines a temporal duration for a bucket. For example, the bucket's temporal duration might be defined as one minute, or 60,000 milliseconds. In block 104, the computer system defines a temporal length of a sliding window measured in buckets. For example, the sliding window might be defined as being 10 buckets long. If each bucket's temporal duration were defined as one minute, then this definition would make the sliding window 10 minutes long.

In block 106, the computer system defines a skip list of endpoints. Such a skip list may be defined by a human user and provided to the computer system. The skip list includes endpoints that should be ignored for various reasons. For example, some of the endpoints occurring in the event data to be analyzed might be known to be spurious, and therefore ought to be included within the skip list. In one embodiment, events involving endpoint pairs in which either endpoint of that pair is contained in the skip list are treated as though they did not occur within the event data.

In block 108, the computer system sets a previous bucket to be a bucket temporally located at time zero. Thus, in an embodiment, the previous bucket is initially set to have a bucket identifier of zero. In block 110, the computer system creates an empty bucket list. In block 111, the computer system sets the current event to be the first event, or tuple, occurring in the event data. Control passes to block 112 of FIG. 1B.

Figure 1B:
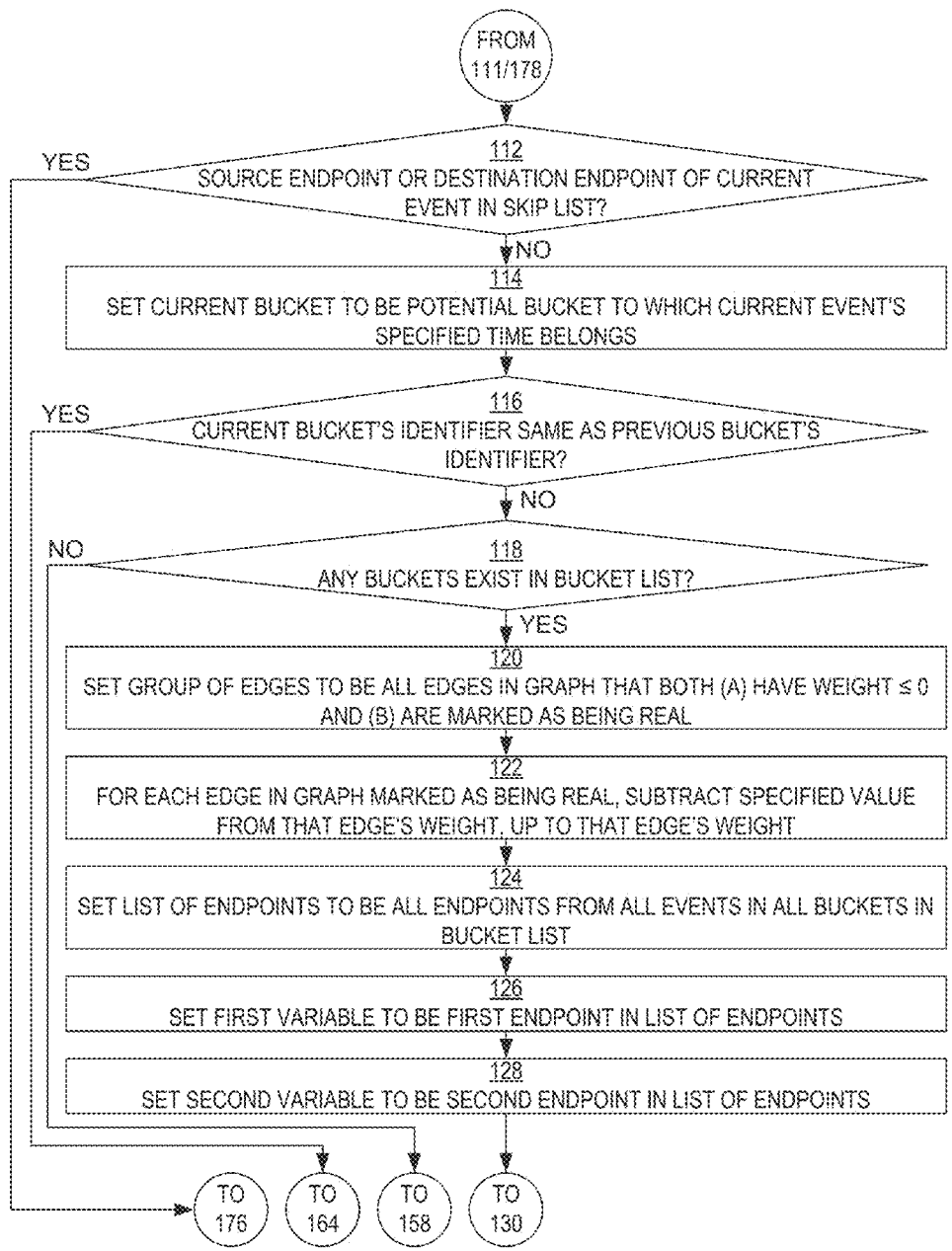

Referring next to FIG. 1B, in block 112, the computer system determines whether a source endpoint or a destination endpoint specified in the current event are contained in the skip list. If either of these endpoints are in contained in the skip list, then control passes to block 176 of FIG. 1E. Otherwise, control passes to block 114.

In block 114, the computer system sets the current bucket to be a potential bucket to which the time specified in the current event belongs. Potentially, the bucket to which the current event's time belongs has not yet been created, but the current event still belongs to some potential bucket that will be created. In one embodiment, the time specified in the current event may be converted from a string into a long number that represents a quantity of milliseconds since some specified moment in time (e.g. Jan. 1, 1970). Each bucket spans some defined time interval having the duration defined in block 102. In one embodiment, each bucket has an identifier that is equal to the starting value of the bucket's time interval divided by the defined bucket duration in milliseconds. If the current event's time falls into a particular bucket's interval, then the current event belongs in the particular bucket.

In block 116, the computer system determines whether the identifier of the current bucket (determined in block 114) is the same as the previous bucket's identifier. If so, then control passes to block 164. Otherwise, control passes to block 118.

In block 118, the computer system determines whether any buckets exist in the bucket list. If no bucket has been created yet, then the bucket list will be empty. If the bucket list is empty, then control passes to block 158 of FIG. 1D. Otherwise, control passes to block 120.

According to an embodiment, the technique described herein incrementally builds a graph. At first, the graph may be empty. However, if the graph is not empty, then each of the edges in the graph may have an associated weight. Each of the edges in the graph may be marked as being "real" or "implied." In block 120, the computer system sets a group of edges to be equal to all edges in the graph that both (a) have a weight that is equal to or less than zero and (b) are marked as being "real." In block 122, for each edge in the graph that is marked as being "real," the computer system subtracts a specified value from that edge's weight, not to exceed the edge's weight. Thus, if the subtraction of the specified value would cause an edge's weight to become less than zero, then the edge's weight becomes zero instead. In one embodiment, the computer system calculates the specified value to be subtracted from the edge's weight by subtracting the previous bucket's identifier from the current bucket's identifier. In this manner, the weights of all real edges in the graph tend to regress toward zero, leaving positive weights for edges that are implied.

In block 124, the computer system sets of list of endpoints to be all of the endpoints from all of the events in all of the buckets then in the bucket list. In one embodiment, each event will involve two such endpoints: the source endpoint and the destination endpoint. Some endpoints may occur multiple times within the list of endpoints. In the list of endpoints, the endpoints are not necessarily paired with each other based on any events in which those endpoints originally were involved. In block 126, the computer system sets a first variable to be a first endpoint in the list of endpoints. In block 128, the computer system also sets a second variable to be the first endpoint in the list of endpoints. Control passes to block 130 of FIG. 1C.

Figure 1C:
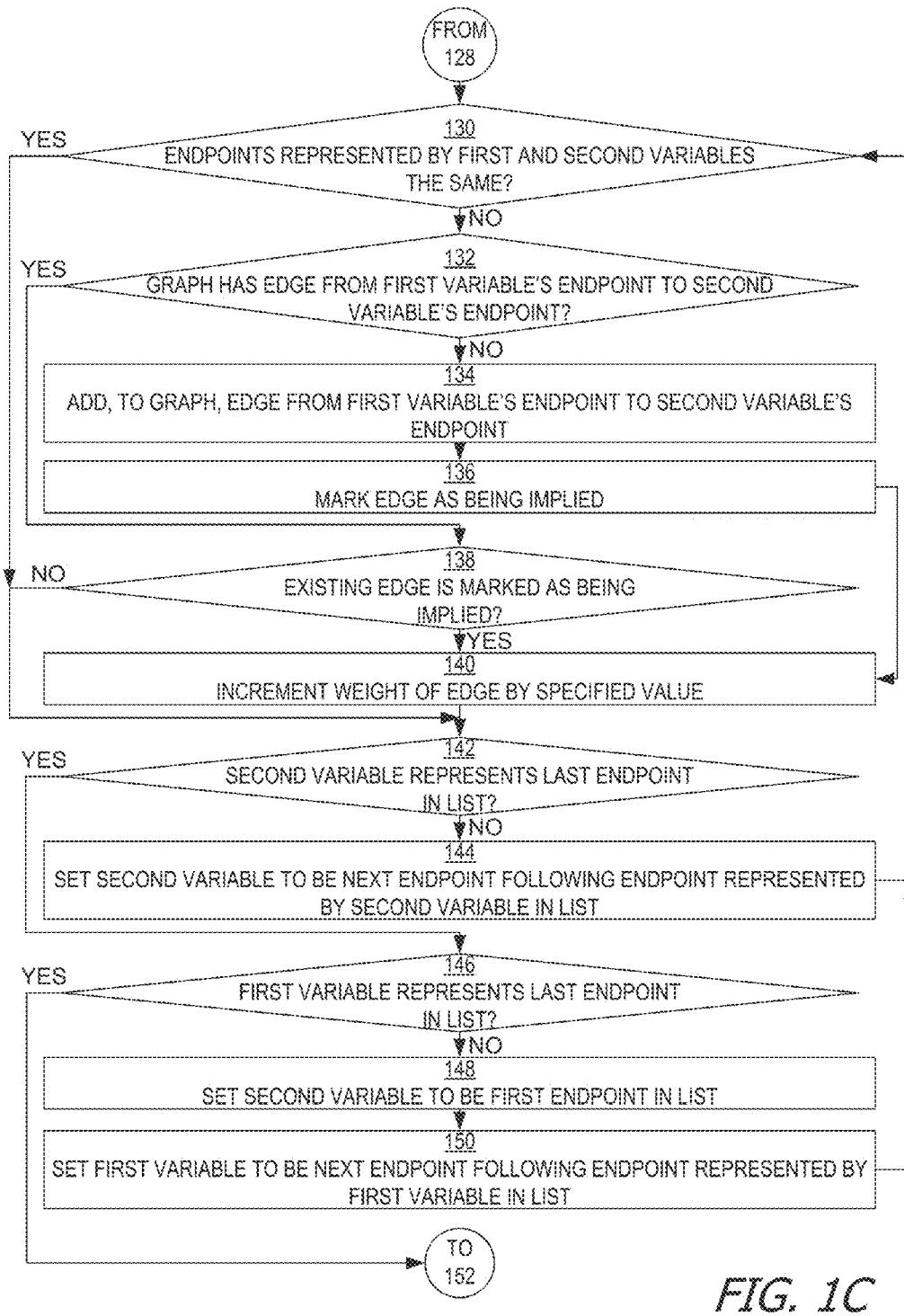

Referring next to FIG. 1C, in block 130, the computer system determines whether the endpoint represented by the first variable is the same as the endpoint represented by the second variable. If so, then control passes to block 142. Otherwise, control passes to block 132.

In block 132, the computer system determines whether the graph contains an edge from the endpoint represented by the first variable to the endpoint represented by the second variable. If so, then control passes to block 134. Otherwise, control passes to block 138.

In block 134, the computer system adds, to the graph, an edge from the endpoint represented by the first variable to the endpoint represented by the second variable. In block 136, the computer system marks the edge added in block 134 as being "implied" (rather than "real"). Control passes to block 140.

Alternatively, in block 138, the computer system determines whether the graph's existing edge from the endpoint represented by the first variable to the endpoint represented by the second variable is marked as being "implied." If so, then control passes to block 140. Otherwise, control passes to block 142.

In block 140, the computer system increments, by a specified value, the weight of the edge from the endpoint represented by the first variable to the endpoint represented by the second variable. In one embodiment, the computer system calculates this specified value by choosing the minimum of (a) the sliding window length, in buckets (defined in block 104) and (b) the difference between the current bucket's identifier and the previous bucket's identifier. Control passes to block 142.

In block 142, the computer system determines whether the second variable represents the last endpoint in the list of endpoints (set in block 124). If so, then control passes to block 146. Otherwise, control passes to block 144.

In block 144, the computer system sets the second variable to be the next endpoint following the endpoint represented by the second variable in the list of endpoints. Control passes back to block 130.

In block 146, the computer system determines whether the first variable represents the last endpoint in the list of endpoints (set in block 124). If so, then control passes to block 152 of FIG. 1D. Otherwise, control passes to block 148.

In block 148, the computer system sets the second variable to be the first endpoint in the list of endpoints. In block 150, the computer system sets the first variable to be the next endpoint following the endpoint represented by the first variable in the list of endpoints. Control passes back to block 130.

Figure 1D:
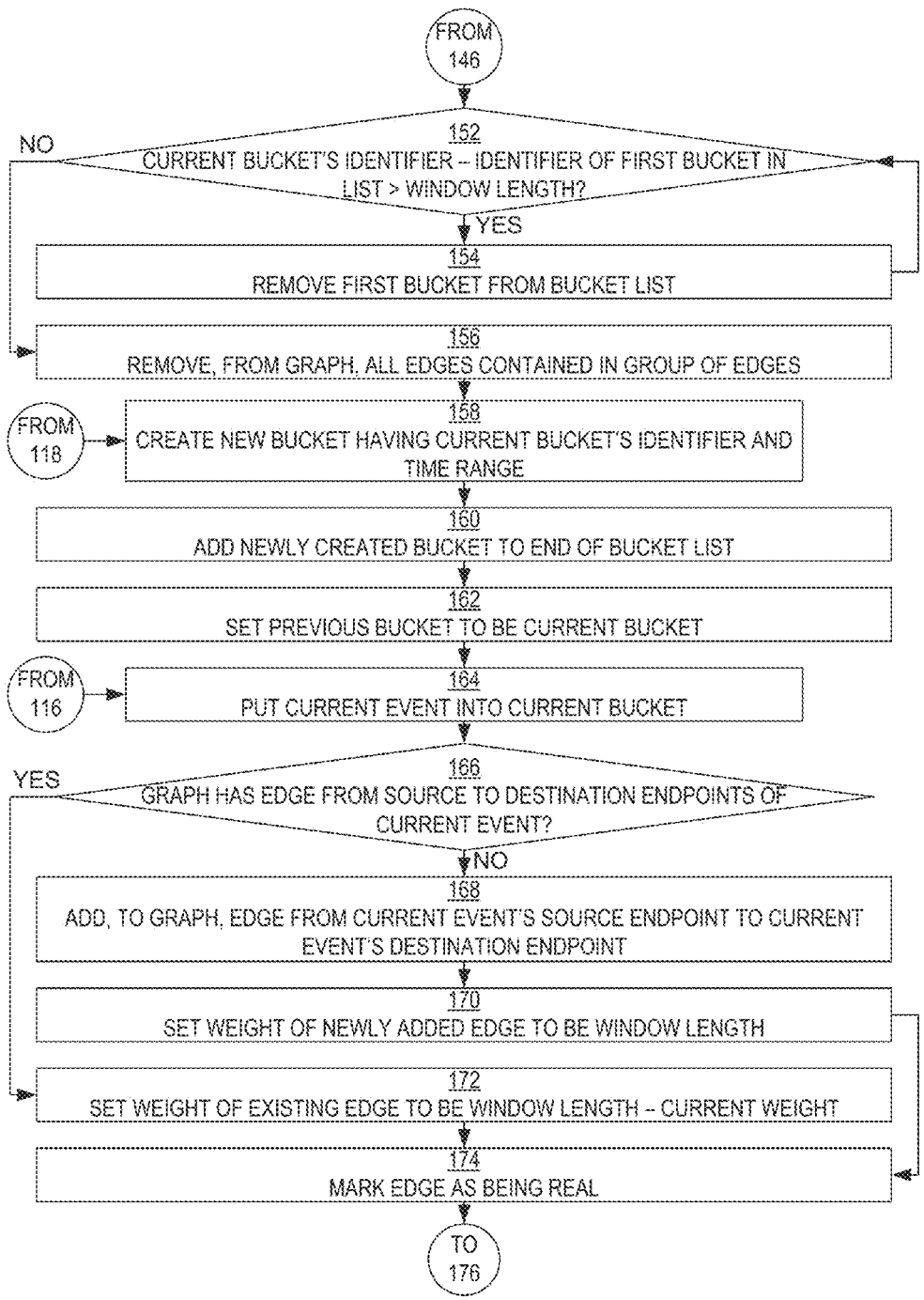

Referring next to FIG. 1D, in block 152, the computer system determines whether the difference between the current bucket's identifier and the identifier of the bucket least recently added to the bucket list (i.e., the first bucket then in the bucket list) is greater than the sliding window's length in buckets. If so, then control passes to block 154. Otherwise, control passes to block 156.

In block 154, the computer system removes, from the bucket list, the bucket least recently added to the bucket list (i.e., the first bucket then in the bucket list). Control passes back to block 152.

Alternatively, in block 156, the computer system removes, from the graph, all of the edges that are contained in the group of edges (constituted in block 120).

In block 158, the computer system creates a new bucket having the current bucket's identifier and temporal range. In block 160, the computer system adds the newly created bucket to the end of the bucket list, making that bucket the most recently added bucket in the bucket list (i.e., the last bucket in the bucket list). In block 162, the computer system sets the previous bucket to be the current bucket.

In block 164, the computer system puts the current event, or tuple, into the current bucket. In block 166, the computer system determines whether the graph contains an edge from the current event's source endpoint to the current event's destination endpoint. If so, then control passes to block 172. Otherwise, control passes to block 168.

In block 168, the computer system adds, to the graph, an edge from the current event's source endpoint to the current event's destination endpoint. In block 170, the computer system sets the weight of the newly added edge (from the current event's source endpoint to the current event's destination endpoint) to be the length of the sliding window in buckets. Control passes to block 174.

Alternatively, in block 172, the computer system sets the weight of the existing edge (from the current event's source endpoint to the current event's destination endpoint) to be the length of the sliding window in buckets minus the current weight of that existing edge. Control passes to block 174.

Figure 1E:
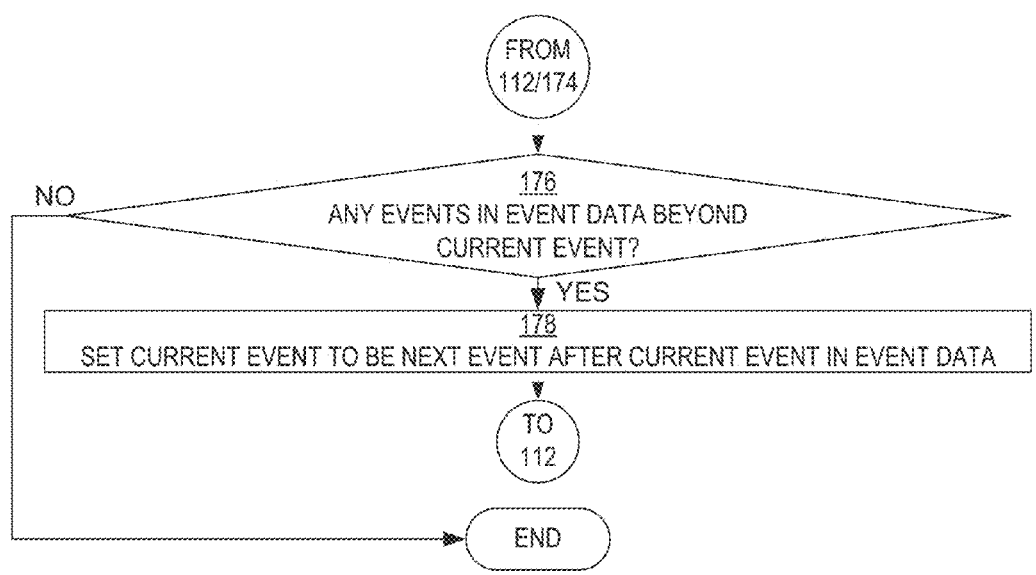

In block 174, the computer system marks the edge (from the current event's source endpoint to the current event's destination endpoint) as being "real." Control passes to block 176 of FIG. 1E.

Referring next to FIG. 1E, in block 176, the computer system determines whether any events exist in the event data beyond the current event. If so, then control passes to block 178. Otherwise, the technique of FIGS. 1A-E concludes.

In block 178, the computer system sets the current event to be the next event following the current event in the event data. Control passes back to block 112 of FIG. 1A.

Result Sets

According to an embodiment, the technique described above in connection with FIG. 1 incrementally builds a strongly-connected graph in which some nodes, representing endpoints in a network, are directly connected together with edges that are marked as being implied rather than real. These edges may be implied because potentially no single event in the event data ever involves both related endpoints together, and yet those edges exist in the graph because separate events occurring recently relative to each other (as determined by the sliding window length) tend to involve both related endpoints. The more often events involving one endpoint tend to occur within the same sliding window as other events involving another endpoint, the greater the weight of the implied edge connecting the nodes for those endpoints in the graph becomes. A computer system may build this graph continuously. Consequently, the graph may be in different states at different moments in time. At any particular moment in time, a user of the computer system might desire to obtain a result set, current as of the particular moment, specifying the pairs of endpoints that are believed to be in implied relationships with each other.

Figure 2:
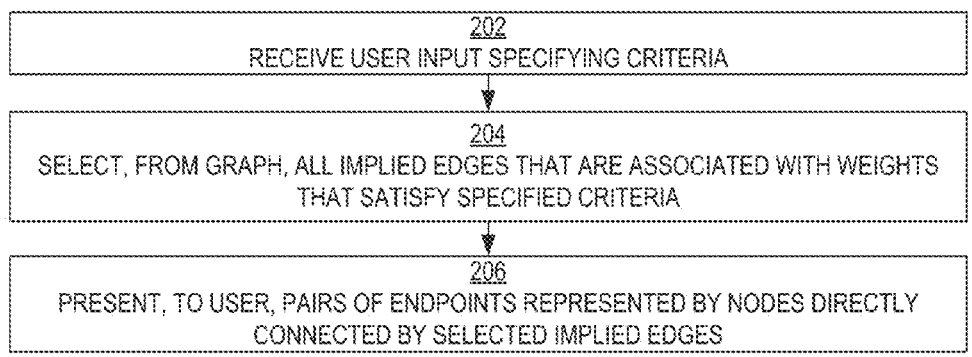
FIG. 2 is a flow diagram an executable computer program illustrating a technique for presenting pairs of endpoints that are involved in implied relationships with each other according to an embodiment of the invention.

FIG. 2 is a flow diagram illustrating a technique for presenting pairs of endpoints that are involved in implied relationships with each other, according to an embodiment of the invention. The technique of FIG. 2 may use the graph that a computer system has constructed, or is currently and continuously constructing, using the technique of FIGS. 1A-E. In block 202, a computer system receives user input that specifies one or more criteria. For example, the criteria might specify a threshold value, indicating that the user desires to see all pairs (and only pairs) of endpoints associated with nodes in the graph that are currently connected by implied edges having a weight not less than the specified threshold value. In block 204, the computer system selects, from the set of all implied edges in the current graph, each implied edge that is associated with a weight that is not less than the specified threshold value. In block 206, for each particular implied edge selected in block 204, the computer system presents, to a user, pairs of identities of endpoints represented by nodes that are directly connected in the graph by that particular implied edge. For example, the computer system may output a list of pairs of IP addresses of endpoints belonging to endpoints paired due to the existence of implied relationships between those endpoints. Due to the manner in which the technique of FIGS. 1A-E is performed, in one embodiment, the list excludes endpoint pairs represented by node pairs that are connected by real, rather than implied, edges.

Example Graph

Figure 3:
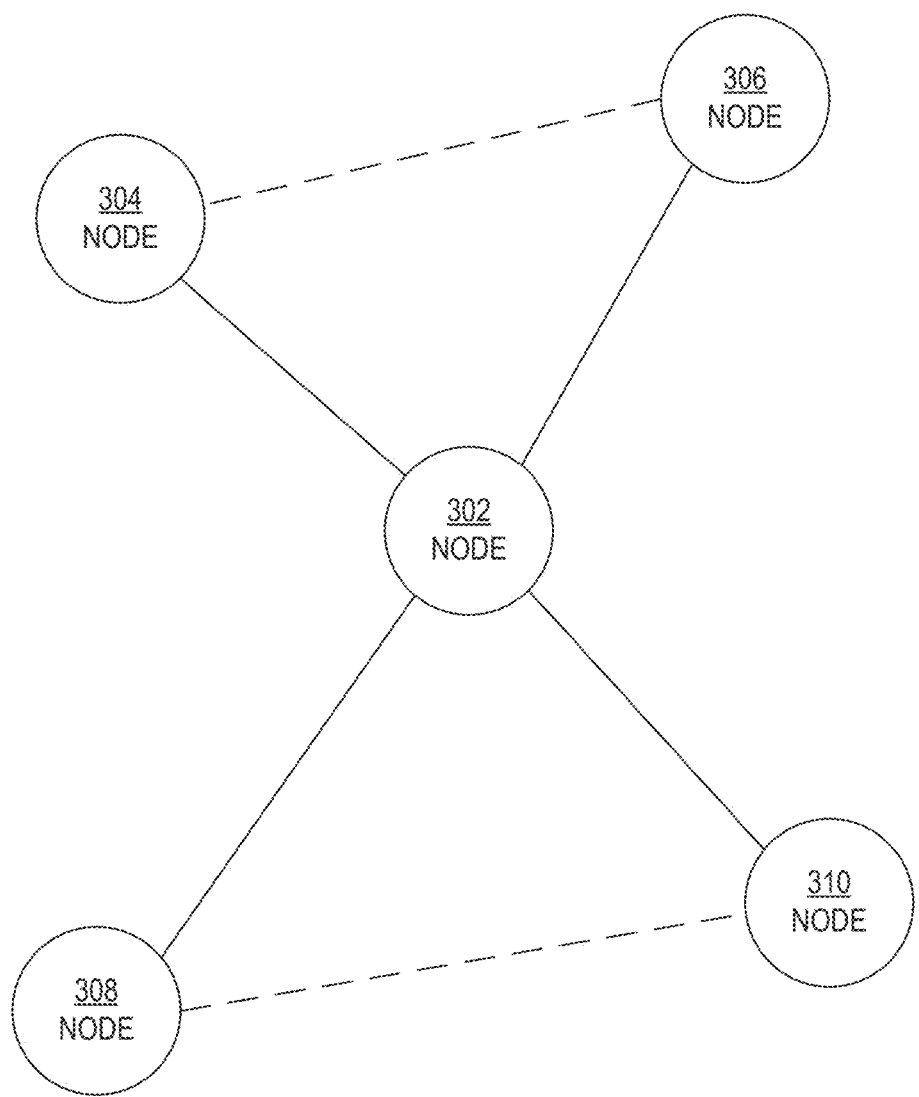
FIG. 3 is a diagram illustrating an example of an executable computer program used for construction of a graph to contain implied edges according to an embodiment of the invention.

FIG. 3 is a diagram illustrating an example of a graph constructed to contain implied edges, according to an embodiment of the invention. As shown in FIG. 3, the graph contains five nodes: 302, 306, 306, 308, and 310. Real edges, or edges marked as being real, are shown as solid lines in the graph. Implied edges, or edges marked as being implied, are shown as dashed lines in the graph.

Various events in the event data might have occurred at various different times in order to cause a computer system to construct the graph shown in FIG. 3. One possible example of a sequence of such events is described herein. Node 302 is connected to node 304 by a real edge. This real edge was generated in response to the endpoint represented by node 302 sending an e-mail (an event) to the endpoint represented by node 304. Node 302 is also connected to node 306 by a real edge. This real edge was generated in response to the endpoint represented by node 306 sending an e-mail (an event) to the endpoint represented by node 302. In contrast, node 304 is connected to node 306 by an implied edge. In the event data, there was no single event in which the endpoints represented by nodes 304 and 306 were both involved. The endpoint represented by node 304 did not ever send an e-mail to the endpoint represented by node 306, or vice-versa, so no real edge exists between those nodes. However, in the event data, there were enough events involving the endpoints representing nodes 304 and 306 separately and occurring within the same sliding window of time that the computing system added the implied edge between nodes 304 and 306 to the graph. In this example, such events included the event involving nodes 302 and 304 and the event involving nodes 302 and 306.

Continuing the example, node 302 is connected to node 308 by a real edge. This real edge was generated in response to the endpoint represented by node 302 sending an e-mail (an event) to the endpoint represented by node 308. Node 302 is also connected to node 310 by a real edge. This real edge was generated in response to the endpoint represented by node 310 sending an e-mail (an event) to the endpoint represented by node 302. In contrast, node 308 is connected to node 310 by an implied edge. In the event data, there was no single event in which the endpoints represented by nodes 308 and 310 were both involved. The endpoint represented by node 308 did not ever send an e-mail to the endpoint represented by node 310, or vice-versa, so no real edge exists between those nodes. However, in the event data, there were enough events involving the endpoints representing nodes 308 and 310 separately and occurring within the same sliding window of time that the computing system added the implied edge between nodes 308 and 310 to the graph. In this example, such events included the event involving nodes 302 and 308 and the event involving nodes 302 and 310.

In the particular example illustrated in FIG. 3, no edge, implied or otherwise, connects nodes 304 and 308. Similarly, no edge, implied or otherwise, connects nodes 306 and 310. Similarly, no edge, implied or otherwise, connects nodes 304 and 310. Such edges are not found in the graph in spite of the existence of events in the event data that involved all of these nodes, though never in the same events. The graph lacks an edge between nodes 304 and 308 because, in this example, the events involving the endpoint represented by node 304 occurred in time windows that did not overlap (or did not significantly overlap) with time windows in which the events involving the endpoint represented by node 308 occurred. The graph lacks an edge between nodes 306 and 310 because, in this example, the events involving the endpoint represented by node 306 occurred in time windows that did not overlap (or did not significantly overlap) with time windows in which the events involving the endpoint represented by node 310 occurred. The graph lacks an edge between nodes 304 and 310 because, in this example, the events involving the endpoint represented by node 304 occurred in time windows that did not overlap (or did not significantly overlap) with time windows in which the events involving the endpoint represented by node 310 occurred. The events involving an endpoint for nodes 304 or 306 may be said to be co-temporal, and the events involving an endpoint for nodes 308 or 310 may be said to be co-temporal. However, the events involving an endpoint for nodes 304 or 308 cannot be said to be co-temporal, the events involving an endpoint for nodes 308 or 310 cannot be said to be co-temporal, and the events involving an endpoint for nodes 304 or 310 cannot be said to be co-temporal.

In one embodiment, the manner in which the technique illustrated in FIGS. 1A-E is performed eventually causes real edges to be removed from the graph. Other real edges may be added to the graph as new events from the event data are processed. Some implied edges might be added to the graph in response to the occurrence of co-temporal events that are relatively infrequent, causing the weights of those implied edges to have relatively low weights when compared to the weights of other implied edges.

Implicit Relationships

Figure 5:
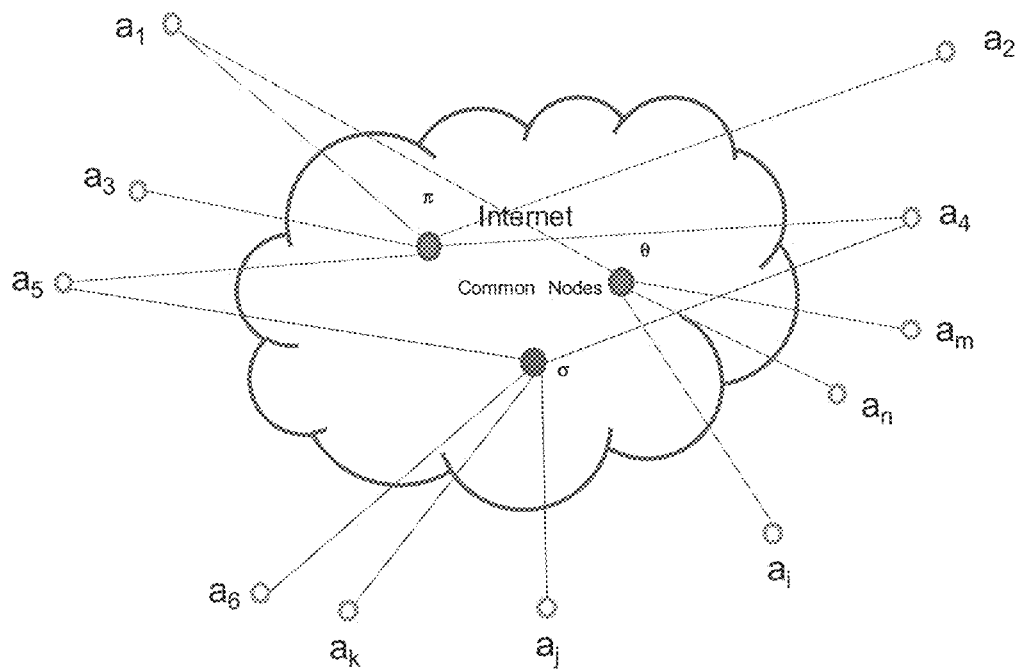
FIG. 5 is a diagram illustrating an example of a data communication network with endpoints being connected together via nodes with which those endpoints are commonly connected, according to an embodiment of the invention.

FIG. 5 is a diagram illustrating an example of networks endpoints being connected together via nodes with which those endpoints are commonly connected, according to an embodiment of the invention. The Internet may be viewed as a group of implicit real-world networks where people, represented by endpoints, are connected together through common entities. As shown in FIG. 5, endpoints $a_1$ through $a_5$ are indirectly connected to each other via common node $\pi$. Endpoints $a_4$, $a_5$, $a_6$, $a_k$, and $a_j$ are indirectly connected to each other via common node $\sigma$. Endpoints $a_1$, $a_i$, $a_n$, and $a_m$ are indirectly connected to each other via common node $\theta$.

Packet Flows

Figure 6:
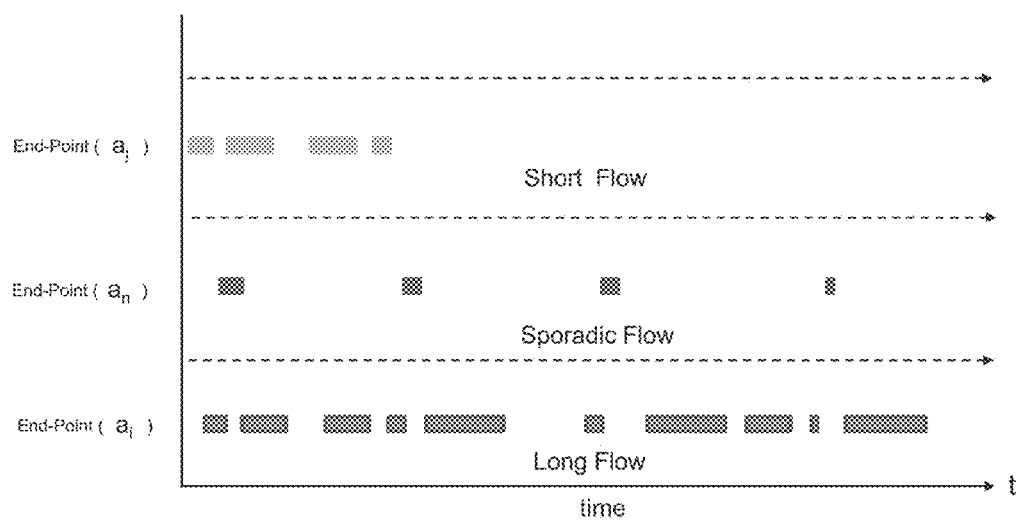
FIG. 6 is a diagram illustrating an example of packet flows that might be observed by a common node, according to an embodiment of the invention.

FIG. 6 is a diagram illustrating an example of packet flows that might be observed by a common node, according to an embodiment of the invention. FIG. 6 shows a packet flow observed from endpoint $a_j$ of FIG. 5. Such a packet flow might be observed by node $\sigma$ of FIG. 5. The packet flow that node $\sigma$ observes from endpoint $a_j$ is a short flow, in which a few packets observed in a relatively short time span are followed by a lengthy absence of any further packets from that endpoint.

FIG. 6 further shows a packet flow observed from endpoint $a_n$ of FIG. 5. Such a packet flow might be observed by node $\theta$ of FIG. 5. The packet flow that node $\theta$ observes from endpoint $a_n$ is a sporadic flow, in which multiple packets are observed over a relatively long time span, separated by intervals in which no packets from that endpoint are observed.

FIG. 6 further shows a packet flow observed from endpoint a, of FIG. 5. Such a packet flow might also be observed by node $\theta$ of FIG. 5. The packet flow that node $\theta$ observes from endpoint a, is a long flow, in which multiple packets are observed over a relatively long time span, separated only by relatively short intervals.

Co-Temporal Activity Discovery by Convolution

Figure 7:
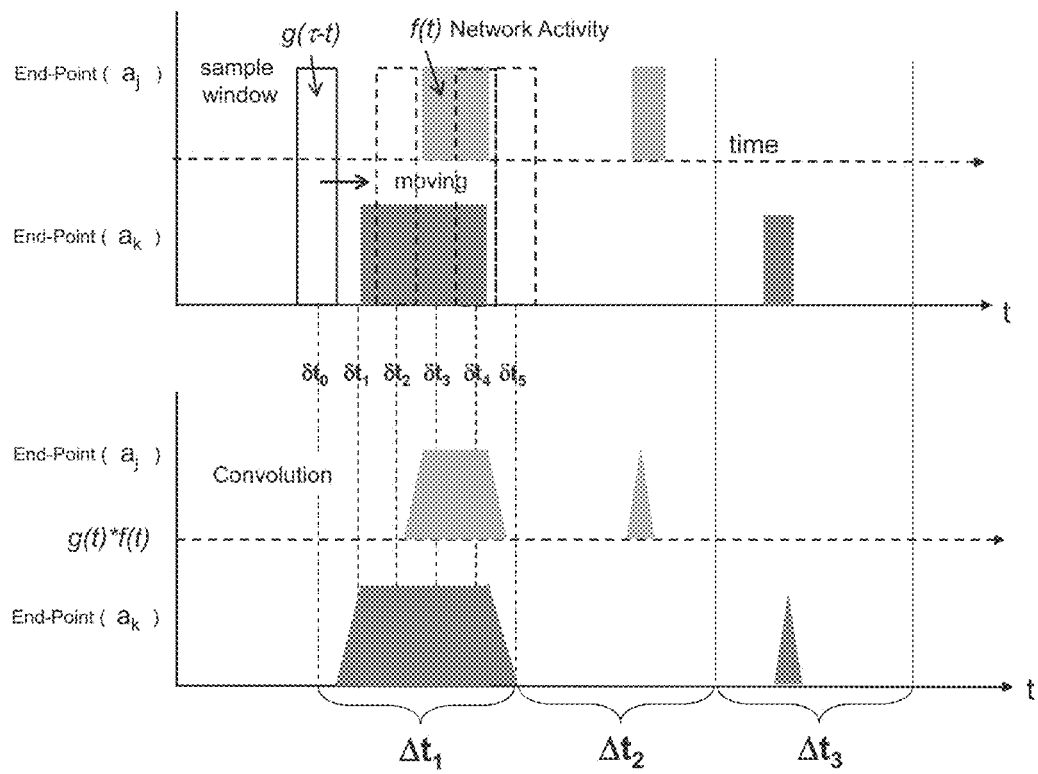
FIG. 7 is a diagram illustrating an example of co-temporal activity discovery by convolution, according to an embodiment of the invention.

FIG. 7 is a diagram illustrating an example of co-temporal activity discovery by convolution, according to an embodiment of the invention. As shown in FIG. 7, packet flows from endpoints $a_j$ and $a_k$ are observed over time. A sample window, $g(\tau-t)$, having a defined duration, moves forward in time. Network activity from one or the other or both of endpoints $a_j$ and $a_k$ may be observed at different moment within the sample window as it moves forward in time. The extent to which network activity is detected during a particular time interval t is specified by the function $f(t)$. FIG. 7 further shows a convolution $g(t)*f(t)$ of the network activity observed from each endpoint. The convolution is measured at increments $\delta t_0$, $\delta t_1$, $\delta t_2$, $\delta t_3$, $\delta t_4$, and $\delta t_5$. These increments fall into an time period $\Delta t_1$. Additional time periods $\Delta t_2$ and $\Delta t_3$ follow time period $\Delta t_1$.

Sample Window and Matched Filter

Figure 8:
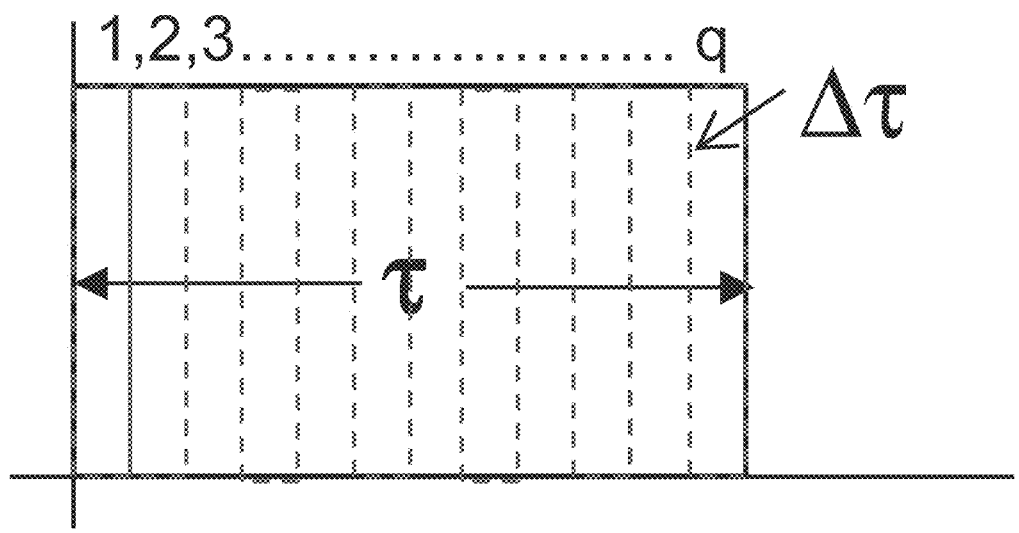
FIG. 8 is a diagram illustrating an example of a sample window, according to an embodiment of the invention.

FIG. 8 is a diagram illustrating an example of a sample window, according to an embodiment of the invention. In an embodiment, a sample window $g(t)$ is defined as a rectangular window having a width $\tau$, a resolution $\Delta\tau$, and some defined quantity of slices q. The width $\tau$ is equal to the quantity of slices q multiplied by the resolution $\Delta\tau$; $\tau=q\,\Delta\tau$.

Figure 9:
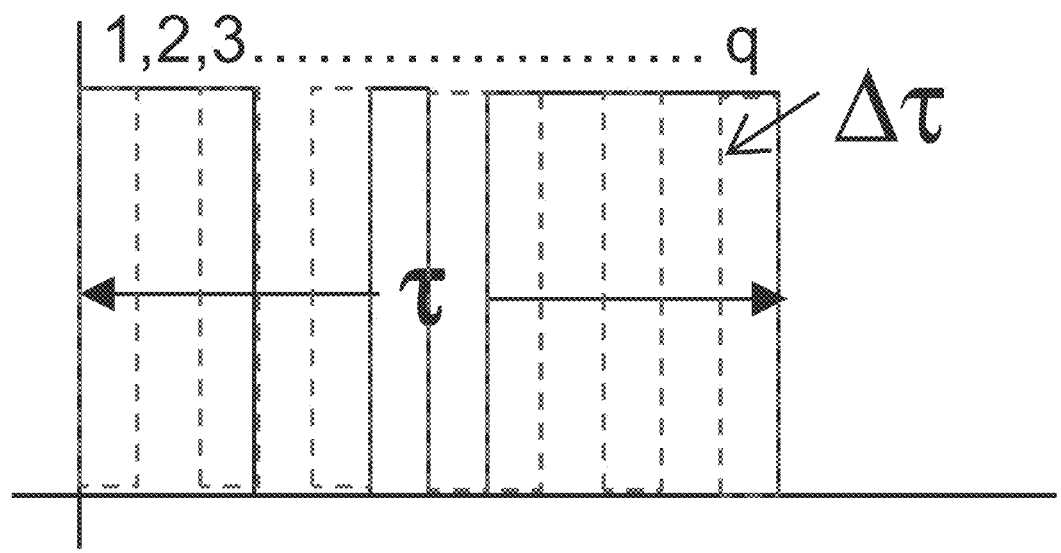
FIG. 9 is a diagram illustrating an example of the sample window of FIG. 8 to which a matched filter has been applied, according to an embodiment of the invention.

FIG. 9 is a diagram illustrating an example of the sample window of FIG. 8 to which a matched filter has been applied, according to an embodiment of the invention. Such a matched filter may be used as $g(t)$ to match a flow pattern or to maximize an output signal-to-noise ratio.

Co-Temporal Activities and Representation

Figure 10:
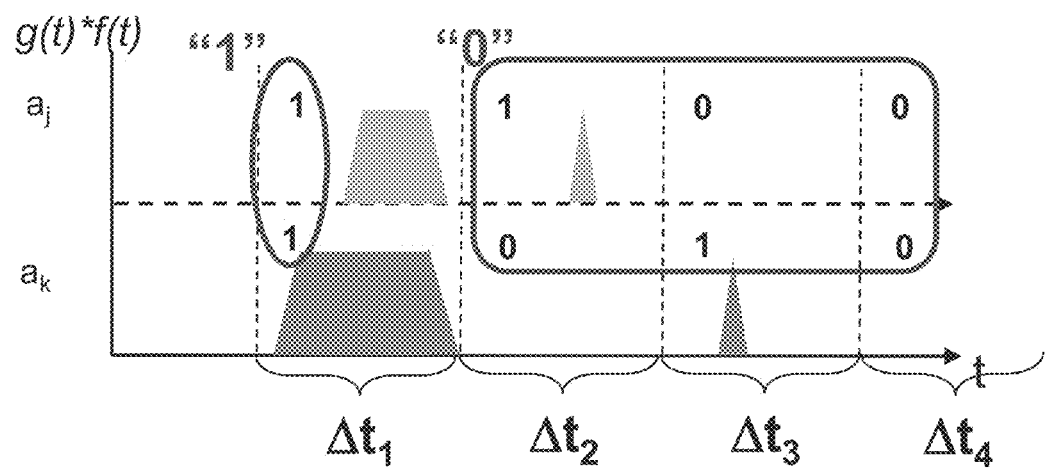
FIG. 10 is a diagram illustrating an example of a binary representation of the presence or lack of co-temporal activity observed from a pair of endpoints in each of several time periods, according to an embodiment of the invention.

FIG. 10 is a diagram illustrating an example of a binary representation of the presence or lack of co-temporal activity observed from a pair of endpoints in each of several time periods, according to an embodiment of the invention. Endpoints $a_j$ and $a_k$ are endpoints that are both connected to a common node (e.g., node $\sigma$ in FIG. 5). According to a binary representation of the presence of absence of co-temporal activity from these endpoints observed at the common node, if traffic activity is observed from both endpoints during a particular time period, then a co-temporal indicator $a_{jk}$ for that endpoint pair is assigned a value of "1" for that time period. Alternatively, if traffic activity is observed from only one or the other or neither of the endpoints during a particular time period, then the co-temporal indicator $a_{jk}$ for that endpoint pair is assigned a value of "0" for that time period. Thus, if $a_j$ represents a binary presence or absence of traffic activity observed from endpoint $a_j$, and if $a_k$ represents a binary presence or absence of traffic activity observed from endpoint $a_k$, then $a_{jk}$ is the intersection (logical "and") of $a_j$ and $a_k$; $a_{jk}=a_j \cap a_k$.

As shown in FIG. 10, during time period $\Delta t_1$, traffic from both endpoints $a_j$ and $a_k$ is observed at the common node. Therefore, during time period $\Delta t_1$, the value of $a_{jk}$ is 1. However, during time periods $\Delta t_2$, $\Delta t_3$, and $\Delta t_4$, traffic from only one or the other or neither of endpoints $a_j$ and $a_k$ is observed at the common node. Therefore, during time periods $\Delta t_2$, $\Delta t_3$, and $\Delta t_4$, the value of $a_{jk}$ is 0.

The binary representation of co-temporal activity for multiple pairs of endpoints within a particular time period (e.g., $\Delta t_n$) may be represented within a bi-valued matrix. FIG. 11 is a diagram illustrating an example of a bi-valued matrix storing binary values representing the presence or absence of co-temporal activity for multiple endpoint pairs during a particular time period, according to an embodiment of the invention. In FIG. 11, each of the endpoints in a network is aligned along both the horizontal and vertical axes. If co-temporal activity for a pair of endpoints occurs during the particular time period, then the values of the matrix cells at the columns and rows corresponding to that pair are set to 1. Otherwise, those values are set to 0. In the matrix, for each j and k, $a_{jk}=a_{kj}$.

Although a bi-valued matrix is illustrated in FIG. 11, alternative embodiments may utilize tri- or quad-valued matrices instead. For example, in a tri-valued matrix, the value of a particular matrix cell may be set to 1 if activity is observed for both endpoints (i.e., co-temporal activity) of the pair to which the cell corresponds. The value of the particular matrix cell may be set to 0 if activity is observed for only one or the other of the endpoints of the pair to which the cell corresponds. The value of the particular matrix cell may be set to −1 if activity not observed for either endpoint of the pair to which the cell corresponds.

Co-Temporal Activity Over Time and its Coefficient

Figure 12:
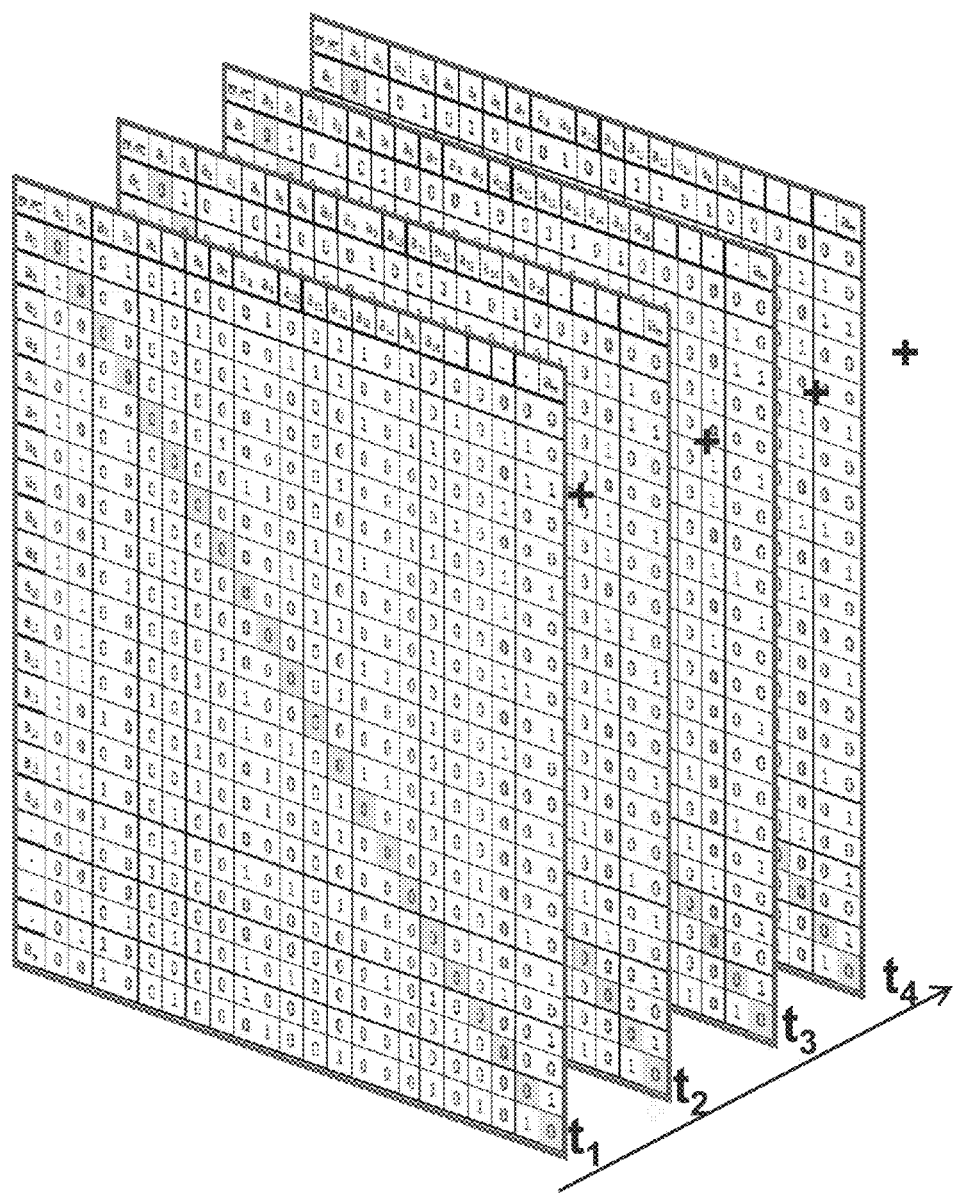
FIG. 12 is a diagram illustrating an example of multiple bi-valued matrices constructed for multiple time periods in a time series of time periods, according to an embodiment of the invention.

As is discussed above, the bi-valued matrix illustrated in FIG. 11 corresponds to just one time period. A similar bi-valued matrix, containing potentially different values, may be constructed for each time period in a time series of time periods. FIG. 12 is a diagram illustrating an example of multiple bi-valued matrices constructed for multiple time periods in a time series of time periods, according to an embodiment of the invention. Separate bi-valued matrices are constructed for time periods starting at times $t_1$, $t_2$, $t_3$, and $t_4$. According to an embodiment, such a time series of matrices may be used to determine, mathematically, the overall degrees or extents to which various pairs of endpoints are implicitly related.

If a variable n is assigned a particular value of j (a first endpoint that may be paired with other various second endpoints k to form various endpoint pairs), then a coefficient $c_{nm}$ may be calculated by summing the values of cell $a_{nk}$ from each matrix $t_m$ in the time series of matrices. If M is the total quantity of matrices in the time series of matrices, then an equation for calculating $c_{nm}$ is:

$$c_{nm} = \sum_{m=1}^{M} (a_{jk})_{t_m}$$

A separate $c_{nm}$ may be calculated for each second endpoint k in the matrices (k=1 . . . p). For a particular first endpoint n, the coefficients $c_{nm}$ for each endpoint pair [n,k], k=1 . . . p may be ranked relative to each other:

$$\text{rank}\left(\sum_{m=1}^{M} (a_{jk})_{t_m}\right) \text{ for } j = n \text{ and } k = 1 \ldots p$$

Given such a ranking, the most related second endpoint to first endpoint n over the time series can be determined to be the highest-ranked of such coefficients, while the least related second endpoint to first endpoint n over the time series can be determined to be the lowest-ranked of such coefficients. Thus, the ranking represents an order of relatedness of various second endpoints to the first endpoint n. The second endpoint most implicitly related to first endpoint n can be determined by:

$$\max\left(\sum_{m=1}^{M} (a_{n1})_{t_m}, \sum_{m=1}^{M} (a_{n2})_{t_m}, \ldots \sum_{m=1}^{M} (a_{np})_{t_m}\right)$$

The second endpoint least implicitly related to first endpoint n can be determined by:

$$\min\left(\sum_{m=1}^{M} (a_{n1})_{t_m}, \sum_{m=1}^{M} (a_{n2})_{t_m}, \ldots \sum_{m=1}^{M} (a_{np})_{t_m}\right)$$

Q-Bit Representation

Figure 13:
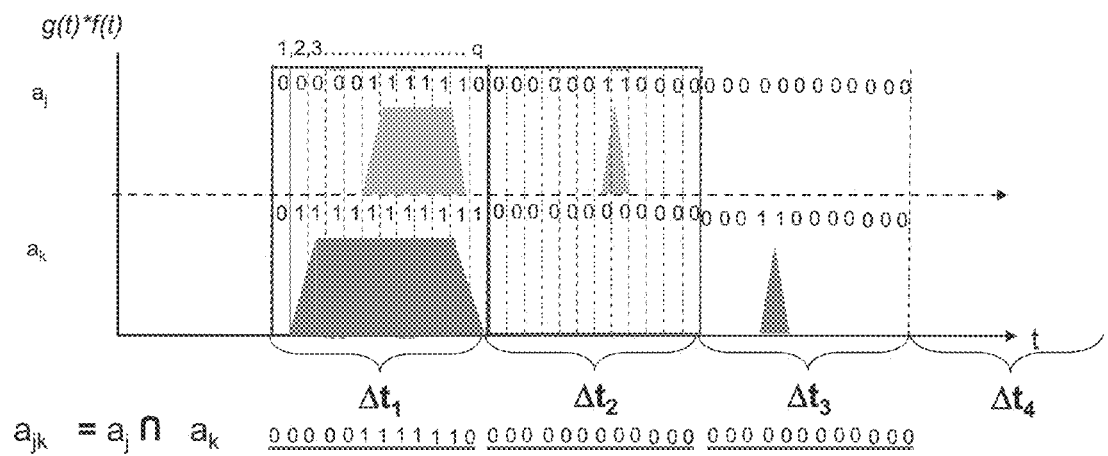
FIG. 13 is a diagram illustrating a bit-wise representation of co-temporal activity, in which each slice of a sample window is represented by a separate bit in a bit field, according to an embodiment of the invention.

As is discussed above in connection with FIG. 8, a sample window may be divided into q slices. FIG. 13 is a diagram illustrating a bit-wise representation of co-temporal activity, in which each slice of a sample window is represented by a separate bit in a bit field, according to an embodiment of the invention. Each time period $\Delta t_1$ through $\Delta t_4$ is divided into q slices, each slice having a corresponding bit. Thus, for endpoint $a_j$, a separate q-bit-long bit field may be generated for each time period $\Delta t_1$ through $\Delta t_4$ representing the traffic activity or lack thereof in those time periods. A bit is set to 1 if activity was detected during the corresponding slice, and 0 otherwise. Similarly, for endpoint $a_k$, a separate q-bit-long bit field may be generated for each time period $\Delta t_1$ through $\Delta t_4$ representing the traffic activity or lack thereof in those time periods.

A bit field representing co-temporal activity between endpoints $a_j$ and $a_k$ during a particular time period may then be calculated as the intersection (logical "and") of the bit fields for those endpoints during that particular time period. For example, given a bit field "000001111110" for endpoint $a_j$, and a bit field "011111111111" for endpoint $a_j$, the intersection bit field $a_{jk}$ would be "000001111110." In an embodiment, this intersection bit field $a_{jk}$ may be represented as a long integer through binary-to-decimal conversion.

Figure 14:
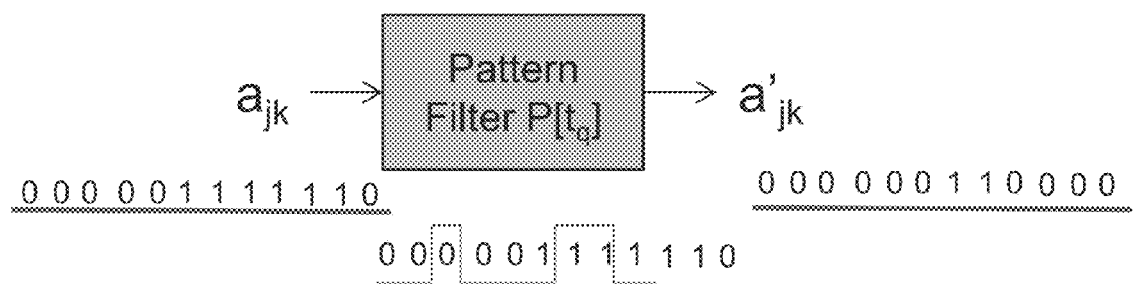
FIG. 14 is a diagram illustrating an example of an application of a pattern filter to a bit field to obtain a filtered bit field, according to an embodiment of the invention.

To correlate the activities of endpoints $a_j$ and $a_k$ more selectively, a pattern filter may be applied to intersection bit field $a_{jk}$ to produce a filtered intersection bit field $a'_{jk}$. The application of the pattern filter may involve the performance of a logical "and" operation between the intersection bit field $a_{jk}$ and a filter bit field of the same length in bits. FIG. 14 is a diagram illustrating an example of an application of a pattern filter to a bit field to obtain a filtered bit field, according to an embodiment of the invention.

Co-Temporal Coefficient Using Q-Bit Representation

Figure 15:
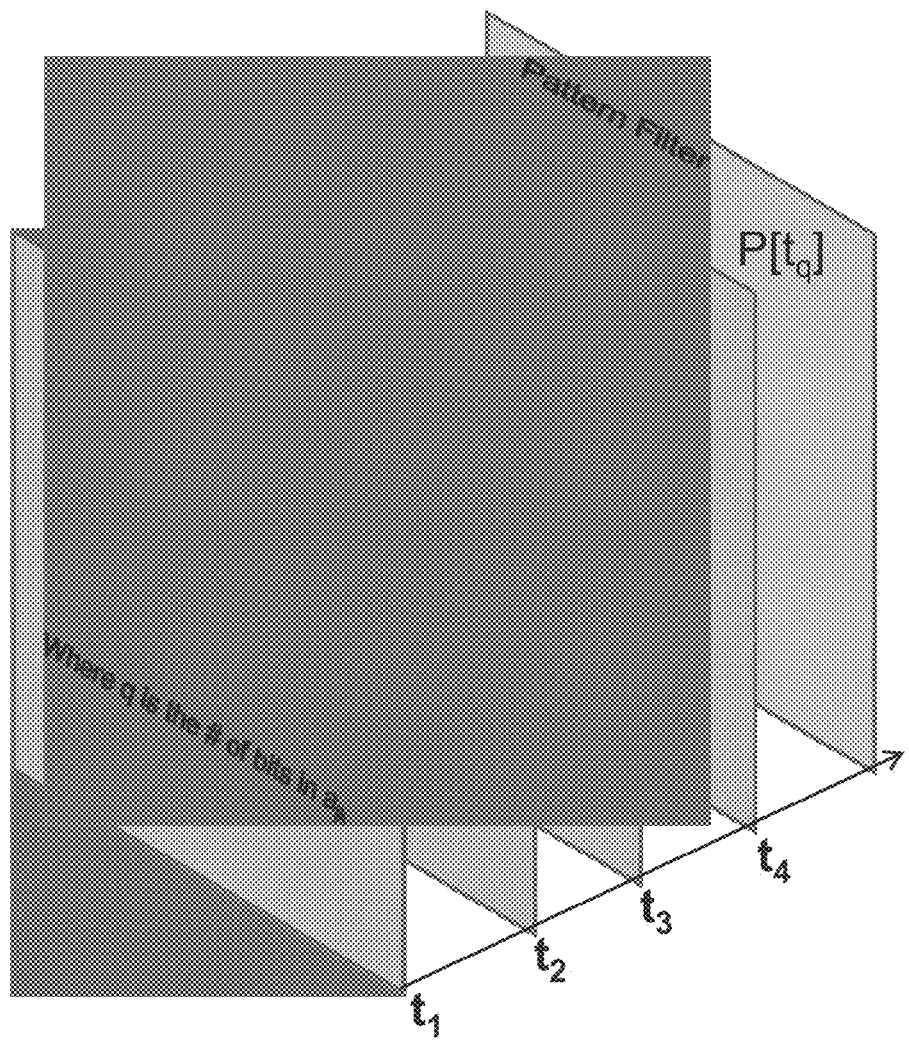
FIG. 15 is a diagram illustrating an example of multiple matrices constructed for multiple time periods in a time series of time periods, in which each row of the matrix represents a separate q-bit intersection bit field, according to an embodiment of the invention.

FIG. 15 is a diagram illustrating an example of multiple matrices constructed for multiple time periods in a time series of time periods, in which each row of the matrix represents a separate q-bit intersection bit field, according to an embodiment of the invention. Each row of the matrix can be represented as a long integer. Separate bit field matrices are constructed for time periods starting at times $t_1$, $t_2$, $t_3$, and $t_4$. A matrix $P[t_q]$ representing a pattern filter also may be constructed; each row of that matrix may be set equal to a pattern filter bit field. According to an embodiment, such a time series of matrices and the pattern filter may be used to determine, mathematically, the overall degrees or extents to which various pairs of endpoints are implicitly related.

If a variable n is assigned a particular value of j (a first endpoint that can be paired with other various second endpoints k to form various endpoint pairs), then a coefficient $c_{nm}$ can be calculated by summing the values of cell $a_{nk}$ from each matrix $t_m$ in the time series of matrices. If M is the total quantity of matrices in the time series of matrices, then an equation for calculating $c_{nm}$ is:

$$c_{nm} = P[t_q]\sum_{m=1}^{M} (a_{jk})t_m$$

A separate $c_{nm}$ can be calculated for each second endpoint k in the matrices (k=1 . . . p). For a particular first endpoint n, the coefficients $c_{nm}$ for each endpoint pair [n,k], k=1 . . . p can be ranked relative to each other:

$$\text{rank}\left(P[t_q]\sum_{m=1}^{M} (a_{jk})_{t_m}\right) \text{ for } j = n \text{ and } k = 1 \ldots p$$

Given such a ranking, the most related second endpoint to first endpoint n over the time series can be determined to be the highest-ranked of such coefficients, while the least related second endpoint to first endpoint n over the time series can be determined to be the lowest-ranked of such coefficients. Thus, the ranking represents an order of relatedness of various second endpoints to the first endpoint n. The second endpoint most implicitly related to first endpoint n can be determined by:

$$\max\left[P[t_q]\left(\sum_{m=1}^{M}(a_{n1})_{t_m}, \sum_{m=1}^{M}(a_{n2})_{t_m}, \ldots \sum_{m=1}^{M}(a_{np})_{t_m}\right)\right]$$

The second endpoint least implicitly related to first endpoint n can be determined by:

$$\min\left[P[t_q]\left(\sum_{m=1}^{M}(a_{n1})_{t_m}, \sum_{m=1}^{M}(a_{n2})_{t_m}, \ldots \sum_{m=1}^{M}(a_{np})_{t_m}\right)\right]$$

Graph Edge Weights for Various Time Periods

Figure 16:
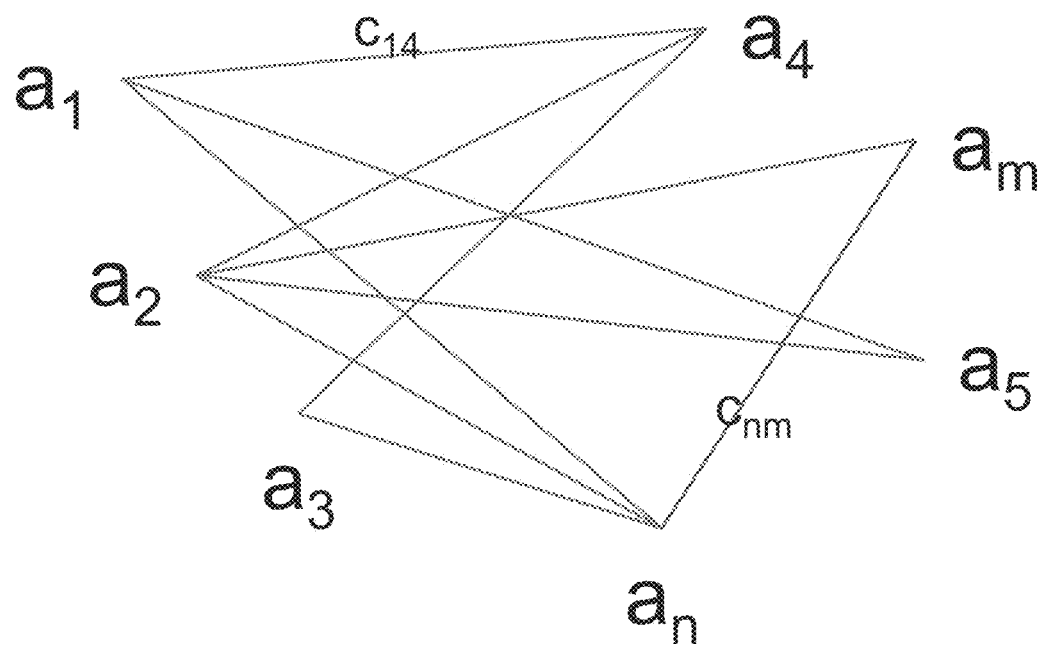
FIG. 16 is a diagram illustrating an example of a graph of endpoints interconnected by edges having weights that represent strengths or extents of co-temporal relationships between those endpoints, according to an embodiment of the invention.

FIG. 16 is a diagram illustrating an example of a graph of endpoints interconnected by edges having weights that represent strengths or extents of co-temporal relationships between those endpoints, according to an embodiment of the invention. In the graph of FIG. 16, various ones of endpoints $a_1$, $a_2$, $a_3$, $a_4$, $a_5$, $a_m$, and $a_n$, are connected together via weighted edges, though some of these endpoints are not connected to each other. The weight of the edge connection endpoints $a_1$ and $a_4$ is shown as $c_{14}$. The weight of the edge connection endpoints $a_n$ and $a_m$ is shown as $c_{nm}$. The weight of each edge could be represented using similar nomenclature. The weight of an edge $c_{nm}$ is representative of the extent to which an implied relationship exists in between the endpoints connected by that edge. In the graph, $c_{nm}=c_{nm}$.

Figure 17:
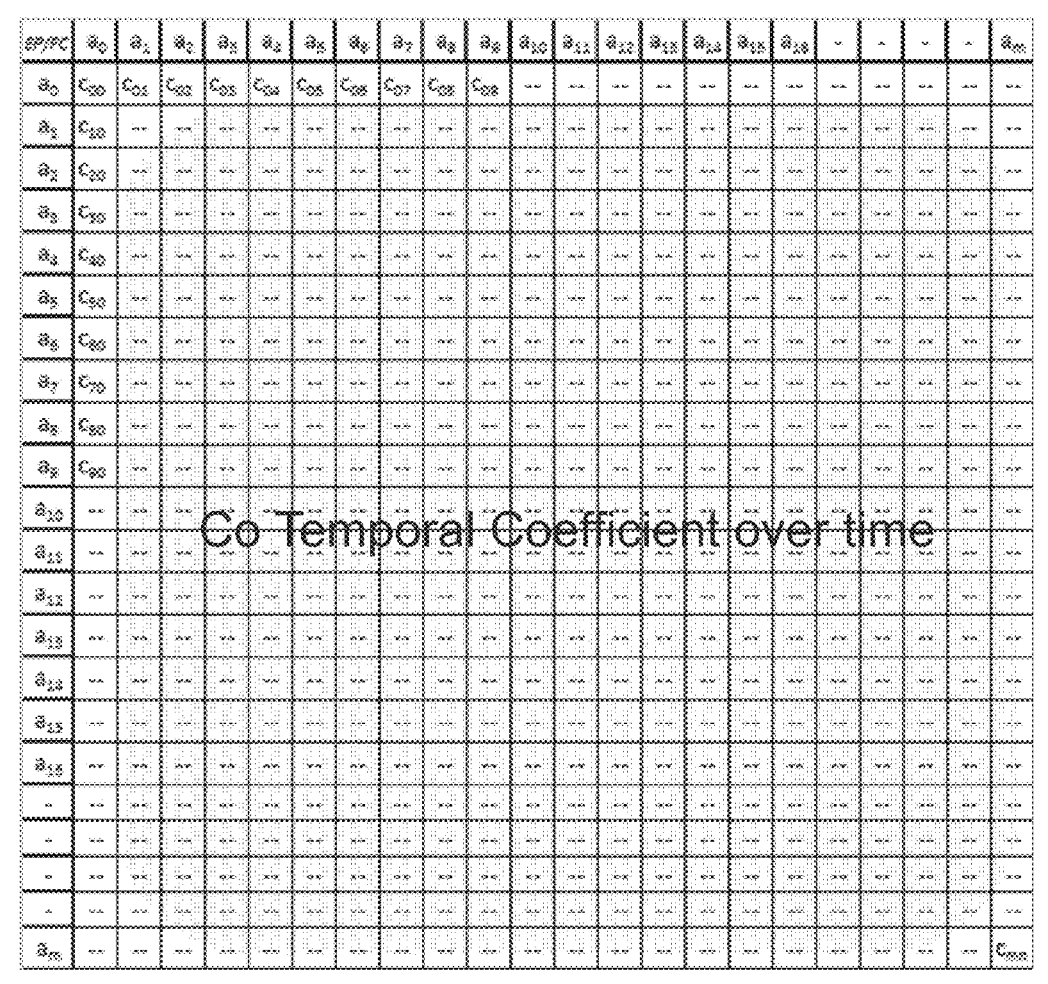

These edge weights may be used to populate a co-temporal coefficient matrix for a particular time period. FIG. 17 is a diagram illustrating an example of a co-temporal co-efficient matrix for a particular time period, according to an embodiment of the invention. In the matrix of FIG. 17, the horizontal and vertical axes each can be indexed by the identifiers of each endpoint in the corresponding graph. For each possible value of m and n, The value for a particular cell at the intersection of (a) the column corresponding to endpoint $a_n$ and (b) the row corresponding to endpoint $a_m$ is the weight $c_{nm}$ of the edge connecting endpoints $a_n$ and $a_m$ in the graph.

Relationship Discovery Through $(a_{jk})t_m$

Figure 18:
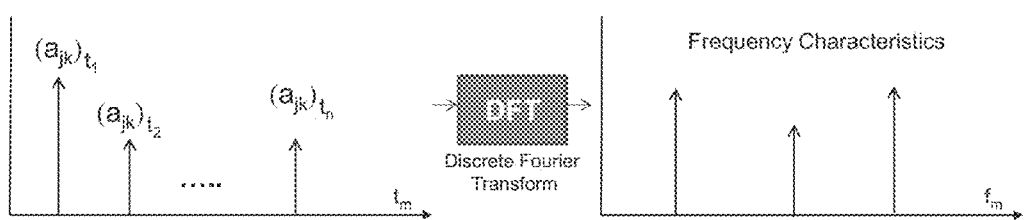
FIG. 18 is a diagram illustrating an example of the application of a discrete Fourier transform (DFT) to a time series of co-temporal activity-indicating values pertaining to a particular pair of endpoints $a_j$ and $a_k$ to obtain frequency characteristics for that pair, according to an embodiment of the invention.

In some of the equations discussed above, $(a_{jk})t_m$ specifies a presence or absence (if a binary value), or extent of co-temporal activity between a pair of endpoints $a_j$ and $a_k$ in a time period $t_m$. FIG. 18 is a diagram illustrating an example of the application of a discrete Fourier transform (DFT) to a time series of co-temporal activity-indicating values pertaining to a particular pair of endpoints $a_j$ and $a_k$ to obtain frequency characteristics for that pair, according to an embodiment of the invention. Such frequency characteristics may be used to find co-temporal activities that happen during time periods of varying specified durations, such as weekly, monthly, day-of-the-weekly, end-of-monthly, etc.

Figure 19:
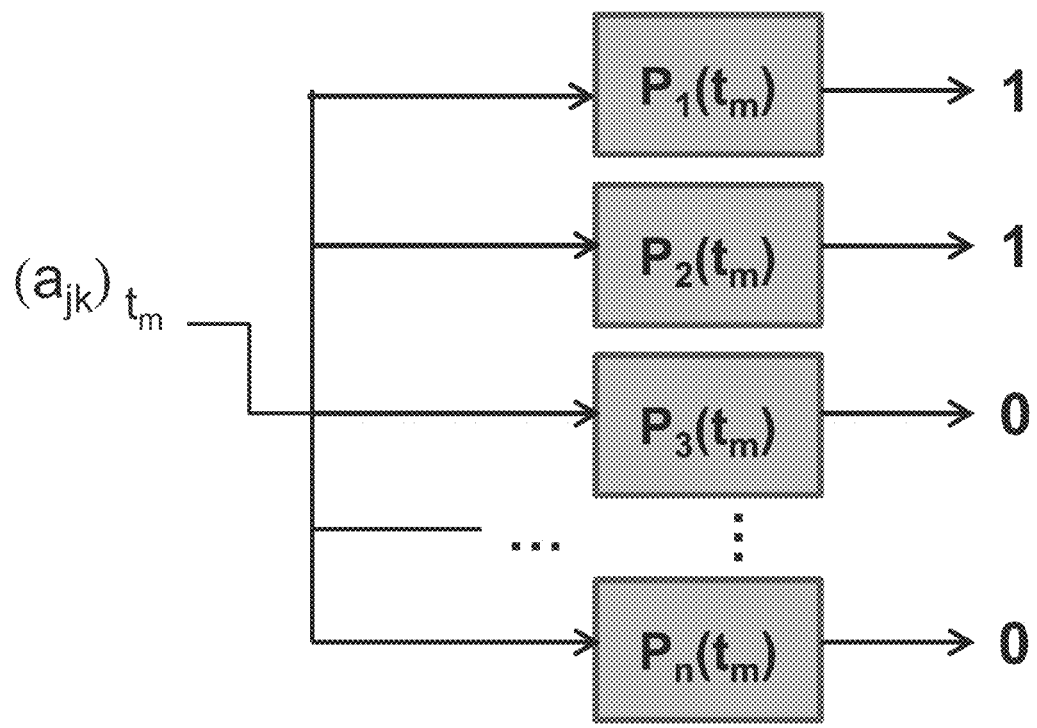
FIG. 19 is a diagram illustrating an example of the application of various different behavior-associated pattern filters to co-temporal activity-indicating values pertaining to a particular pair of endpoints $a_j$ and $a_k$, according to an embodiment of the invention.

FIG. 19 is a diagram illustrating an example of the application of various different behavior-associated pattern filters to co-temporal activity-indicating values pertaining to a particular pair of endpoints $a_j$ and $a_k$, according to an embodiment of the invention. As shown in FIG. 19, a co-temporal activity-indicating value $(a_{jk})t_m$ for time period m may be passed, potentially in parallel, through multiple different pattern filters $P_1(t_m)$ through $P_n(t_m)$. Each pattern filter may be associated with a different specified behavior. If value $(a_{jk})t_m$ passes a particular pattern filter (e.g., if the application of the particular pattern filter to that value returns "true" or 1), then that is indicative of the endpoint pair $a_j$ and $a_k$ possessing that particular pattern filter's associated specified behavior. Alternatively, if value $(a_{jk})t_m$ fails a particular pattern filter (e.g., if the application of the particular pattern filter to that value returns "false" or 0), then that is indicative of the endpoint pair $a_j$ and $a_k$ not possessing that particular pattern filter's associated specified behavior.

Hardware Overview

Figure 4A:
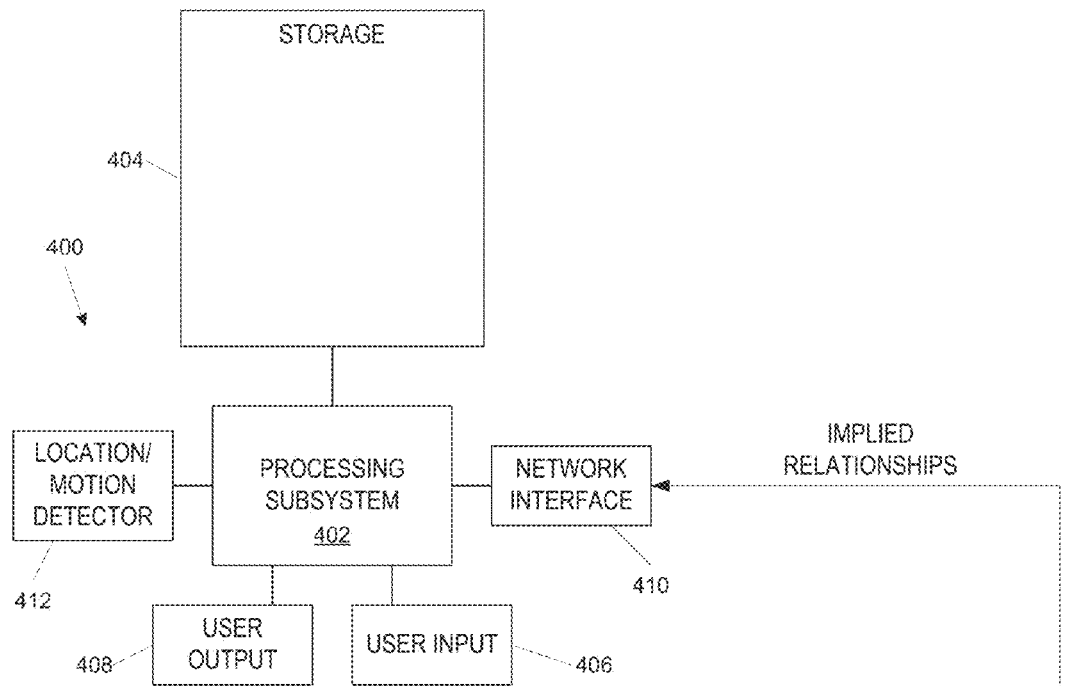
FIG. 4A is a simplified block diagram of an implementation of a data processing device according to an embodiment of the present invention.

FIG. 4A is a simplified block diagram of an implementation of a device 400 according to an embodiment of the present invention. Device 400 may be a mobile device, a handheld device, a notebook computer, a desktop computer, or any suitable electronic device capable of data processing and with a screen for displaying images and that is capable of communicating with a server 450 as described herein. Device 400 includes a processing subsystem 402, a storage subsystem 404, a user input device 406, a user output device 408, a network interface 410, and a location/motion detector 412.

Processing subsystem 402, which may be implemented as one or more integrated circuits (e.g., e.g., one or more single-core or multi-core microprocessors or microcontrollers), can control the operation of device 400. In various embodiments, processing subsystem 402 can execute a variety of programs in response to program code and can maintain multiple concurrently executing programs or processes. At any given time, some or all of the program code to be executed may be resident in processing subsystem 402 and/or in storage subsystem 404.

Through suitable programming, processing subsystem 402 can provide various functionality for device 400. For example, processing subsystem 402 can execute application programs (or "apps").

Storage subsystem 404 may be implemented, e.g., using disk, flash memory, or any other storage media in any combination, and may include volatile and/or non-volatile storage as desired. In some embodiments, storage subsystem 404 may store one or more application programs to be executed by processing subsystem 402. In some embodiments, storage subsystem 404 may store other data. Programs and/or data may be stored in non-volatile storage and copied in whole or in part to volatile working memory during program execution.

A user interface may be provided by one or more user input devices 406 and one or more user output devices 408. User input devices 406 may include a touch pad, touch screen, scroll wheel, click wheel, dial, button, switch, keypad, microphone, or the like. User output devices 408 may include a video screen, indicator lights, speakers, headphone jacks, or the like, together with supporting electronics (e.g., digital-to-analog or analog-to-digital converters, signal processors, or the like). A customer may operate input devices 406 to invoke the functionality of device 400 and may view and/or hear output from device 400 via output devices 408.

Network interface 410 may provide voice and/or data communication capability for device 400. For example, network interface 410 may provide device 400 with the capability of communicating with server 450. In some embodiments network interface 410 may include radio frequency (RF) transceiver components for accessing wireless voice and/or data networks (e.g., using cellular telephone technology, advanced data network technology such as 4G, 4G or EDGE, WiFi (IEEE 802.11 family standards, or other mobile communication technologies, or any combination thereof), and/or other components. In some embodiments network interface 410 may provide wired network connectivity (e.g., Ethernet) in addition to or instead of a wireless interface. Network interface 410 may be implemented using a combination of hardware (e.g., antennas, modulators/demodulators, encoders/decoders, and other analog and/or digital signal processing circuits) and software components.

Location/motion detector 412 may detect a past, current or future location of device 400 and/or a past, current or future motion of device 400. For example, location/motion detector 412 may detect a velocity or acceleration of mobile electronic device 400. Location/motion detector 412 may comprise a Global Positioning Satellite (GPS) receiver and/or an accelerometer. In some instances, processing subsystem 402 determines a motion characteristic of device 400 (e.g., velocity) based on data collected by location/motion detector 412. For example, a velocity may be estimated by determining a distance between two detected locations and dividing the distance by a time difference between the detections.

Figure 4B:
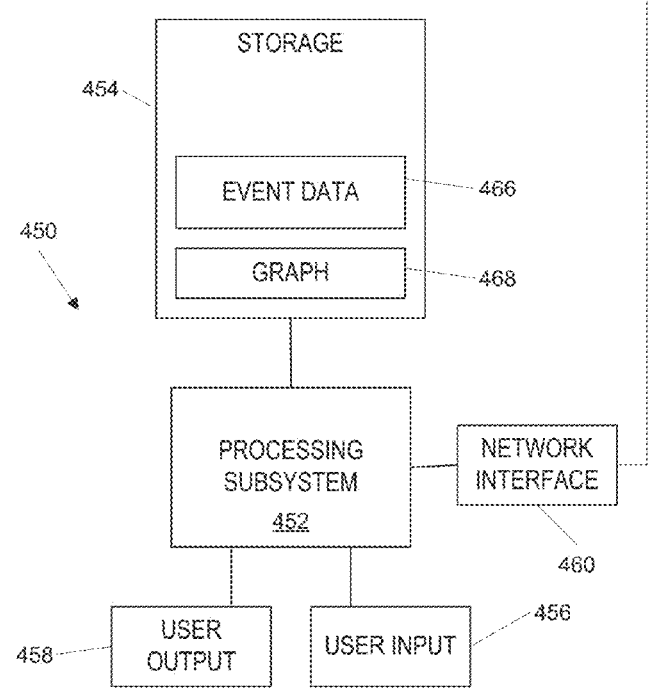
FIG. 4B is a simplified block diagram of an implementation of a server device according to an embodiment of the present invention.

FIG. 4B is a simplified block diagram of an implementation of server 450 according to an embodiment of the present invention. Server 450 includes a processing subsystem 452, storage subsystem 454, a user input device 456, a user output device 458, and a network interface 460. Network interface 460 may have similar or identical features as network interface 410 of device 400 described above.

Processing subsystem 452, which may be implemented as one or more integrated circuits (e.g., a conventional microprocessor or microcontroller), may control the operation of server 450. In various embodiments, processing subsystem 452 may execute a variety of programs in response to program code and may maintain multiple concurrently executing programs or processes. At any given time, some or all of the program code to be executed may be resident in processing subsystem 452 and/or in storage subsystem 454.

Through suitable programming, processing subsystem 452 may provide various functionality for server 450. Thus, server 450 may interact with applications being executed on device 400 in order to provide implied relationships, or identities of pairs of endpoints involved in implied relationships with each other, to device 400. In one embodiment, server 450 stores event data 466, and generates graph 468 based on event data 466.

Storage subsystem 454 may be implemented, e.g., using disk, flash memory, or any other storage media in any combination, and may include volatile and/or non-volatile storage as desired. In some embodiments, storage subsystem 454 may store one or more application programs to be executed by processing subsystem 452. In some embodiments, storage subsystem 454 may store other data. Programs and/or data may be stored in non-volatile storage and copied in whole or in part to volatile working memory during program execution.

A user interface may be provided by one or more user input devices 456 and one or more user output devices 458. User input and output devices 456 and 458 may be similar or identical to user input and output devices 406 and 408 of device 400 described above. In some instances, user input and output devices 456 and 458 are configured to allow a programmer to interact with server 450. In some instances, server 450 may be implemented at a server farm, and the user interface need not be local to the servers.

It will be appreciated that device 400 and server 450 described herein are illustrative and that variations and modifications are possible. A device may be implemented as a mobile electronic device and may have other capabilities not specifically described herein (e.g., telephonic capabilities, power management, accessory connectivity, etc.). In a system with multiple devices 400 and/or multiple servers 450, different devices 400 and/or servers 450 may have different sets of capabilities; the various devices 400 and/or servers 450 may be but need not be similar or identical to each other.

Further, while device 400 and server 450 are described with reference to particular blocks, it is to be understood that these blocks are defined for convenience of description and are not intended to imply a particular physical arrangement of component parts. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present invention may be realized in a variety of apparatus including electronic devices implemented using any combination of circuitry and software.

Additionally, while device 400 and server 450 are described as singular entities, it is to be understood that each may include multiple coupled entities. For example, server 450 may include, a server, a set of coupled servers, a computer and/or a set of coupled computers.

Any of the computer systems mentioned herein may utilize any suitable number of subsystems. In some embodiments, a computer system includes a single computer apparatus, where the subsystems may be the components of the computer apparatus. In other embodiments, a computer system may include multiple computer apparatuses, each being a subsystem, with internal components.

The subsystems may be interconnected via a system bus. Additional subsystems may be a printer, keyboard, fixed disk, monitor, which may be coupled to display adapter. Peripherals and input/output (I/O) devices, which couple to an I/O controller, may be connected to the computer system by any number of means known in the art, such as serial port. For example, serial port or external interface (e.g. Ethernet, Wi-Fi, etc.) may be used to connect computer system to a wide area network such as the Internet, a mouse input device, or a scanner. The interconnection via the system bus may allow the central processor to communicate with each subsystem and to control the execution of instructions from system memory or the fixed disk, as well as the exchange of information between subsystems. The system memory and/or the fixed disk may embody a computer readable medium. Any of the values mentioned herein may be output from one component to another component and may be output to the user.

A computer system may include a plurality of the same components or subsystems, e.g., connected together by an external interface or by an internal interface. In some embodiments, computer systems, subsystem, or apparatuses may communicate over a network. In such instances, one computer may be considered a client and another computer a server, where each may be part of a same computer system. A client and a server may each include multiple systems, subsystems, or components.

It should be understood that any of the embodiments of the present invention may be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a solid state drive, a CD or data disc, or an entire computer system), and may be present on or within different computer program products within a system or network. A computer system may include a monitor, printer, or other suitable display for providing any of the results mentioned herein to a user.

Any of the methods described herein may be totally or partially performed with a computer system including one or more processors, which may be configured to perform the steps. Thus, embodiments may be directed to computer systems configured to perform the steps of any of the methods described herein, potentially with different components performing a respective steps or a respective group of steps. Although presented as numbered steps, steps of methods herein may be performed at a same time or in a different order. Additionally, portions of these steps may be used with portions of other steps from other methods. Also, all or portions of a step may be optional. Additionally, any of the steps of any of the methods may be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

GLOSSARY

As used herein, the terms below have the following definitions:

Graph: a collection of nodes and edges.

Node: a point or vertex in a graph. A node may represent an endpoint.

Edge: a direct link or connection between two nodes in a graph.

Co-temporal: occurring temporally together within a same specified temporal window.

Endpoint: a computer system connected to a network. Each endpoint has a unique identifier, such as an Internet Protocol address or a MAC address Weight: a measure of significance associated with something in a graph, such as an edge.

Network: a communication system of interconnected endpoints or interconnected computing devices. The Internet is an example of a network.

Bucket: a data structure stored in storage media associated with a data processing device having a unique identifier and an associated time range, capable of containing zero or more events.

Event: an activity occurring at a definite time and involving participants. The transmission of an e-mail message is an example of an event. In that example, the participants include a source (sender) and a destination (recipient).

Real edge: an edge that was added to a graph due to the existence of an event that involved participants that are endpoints represented by nodes directly connected by that edge.

Implied edge: an edge that was added to a graph due to the existence of co-temporal events involving endpoints represented by nodes directly connected by that edge, even though no single event of those co-temporal events involve both endpoints together.

Processor: a central processing unit of a computing device, or a processing core within such a central processing unit containing multiple processing cores. A processor is hardware, unlike a process, which a processor executes.

Data processing device: a device having at least a digital processor, digital memory and associated supporting hardware for executing code stored in computer-readable media and may be a whole or part of a computer system.

What is claimed is:

1. A computer-implemented method comprising:
determining, using a data processing device, that a first entity was involved in a first event occurring at a first time;
determining, using the data processing device, that a second entity, different from the first entity, was involved in a second event, separate from the first event, occurring at a second time different from the first time;
comparing the first time with the second time using the data processing device to determine whether the first time is within a specified amount of time from the second time;
in response to determining that the first entity was involved in an event that occurred within the specified amount of time of an event in which the second entity was involved, storing information in non-volatile storage media indicative of an existence of an implied relationship between the first entity and the second entity, wherein storing the information indicative of the existence of the implied relationship comprises:

creating, in a graph, a first edge connecting a node for the first entity to a node for the second entity;

marking the first edge as being implied rather than real; and modifying a weight of the first edge based at least in part on a specified value, wherein modifying the weight of the first edge based at least in part on the specified value comprises incrementing the weight based at least in part on a temporal distance between the first event and the second event;

wherein the first entity is a first endpoint in a network; wherein the second entity is a second endpoint in the network; wherein the first event is a first transaction in which the first endpoint sent data to a third endpoint different from the first and second endpoints in the network; and wherein the second event is a second transaction in which a fourth endpoint different from the first, second, and third endpoints in the network sent data to the second endpoint, applying via the data processing device a convolution window as a matched filter to a series of signals representing extents of co-temporal activity by endpoints connected to a common node during different time slices in a series of time slices; and causing the data processing device to use results of the application of the convolution window to produce a filtered series of signals in which a signal-to-noise ratio has been increased relative to the series of signals prior to the application; and reporting to an output device that said implied relationship exists.

2. The computer-implemented method of claim 1, further comprising:

in response to determining that the first event involved both the first endpoint and the third endpoint:

adding, to the graph, a second edge connecting a node for the first endpoint to a node for the third endpoint, and marking the second edge as being real rather than implied; and in response to determining that the second event involved both the second endpoint and the fourth endpoint:

adding, to the graph, a third edge connecting a node for the second endpoint to a node for the fourth endpoint, and marking the third edge as being real rather than implied.

3. The computer-implemented method of claim 1, further comprising:

determining that the second entity was involved in a third event, separate from the first and second events, occurring at a third time different from the first and second times;

determining that the third time is within the specified amount of time of the first time; and in response to determining that the second entity was involved in another event that occurred within the specified amount of time of an event in which the first entity was involved, incrementing the weight of the first edge based at least in part on a temporal distance between the first event and the third event.

4. A computer-implemented method comprising:
for each particular event in a set of events:

selecting, by means of a data processing device, from a set of data buckets, a particular data bucket that is associated with a time range into which a time at which the particular event occurred falls, and causing the data processing device to insert data representing the particular event into the particular data bucket;

generating by means of the data processing device a first list that includes each endpoint that is involved in an event that is contained in a data bucket that is associated with a time range that falls into a first specified temporal window;

for each particular endpoint in the first list, causing the data processing device to increment weights of implied graph edges connecting the particular endpoint to each other endpoint in the first list;

causing the data processing device to mark graph edges connecting pairs of endpoints that are both involved in a same event as being real rather than implied;

applying via the data processing device a convolution window as a matched filter to a series of signals representing extents of co-temporal activity by endpoints connected to a common node during different time slices in a series of time slices; and causing the data processing device to use results of the application of the convolution window to produce a filtered series of signals in which a signal-to-noise ratio has been increased relative to the series of signals prior to the application; and causing the data processing device to display a representation of the graph via an output device.

5. The computer-implemented method of claim 4, further comprising:

causing the data processing device to decrement weights of graph edges that are marked as being real rather than implied; and causing the data processing device to remove, from a graph, real graph edges that are associated with weights that are below a specified threshold value.

6. The computer-implemented method of claim 4, further comprising:

causing the data processing device to generate a second list that includes each endpoint that is involved in an event that is contained in a data bucket that is associated with a time range that falls into a second specified temporal window that partially overlaps the first specified temporal window;

for each particular endpoint in the second list, causing the data processing device to increment weights of implied graph edges connecting the particular endpoint in the second list to each other endpoint in the second list.

7. The computer-implemented method of claim 4, further comprising:

receiving at the data processing device one or more criteria as input;

causing the data processing device to determine a result set of endpoints that are connected to at least one implied graph edge associated with a weight that satisfies the one or more criteria; and presenting the result set to an output device.

8. A non-transitory computer-readable storage medium storing instructions which, when executed by one or more processors, cause the one or more processors to:

determine that a first entity was involved in a first event occurring at a first time;

determine that a second entity, different from the first entity, was involved in a second event, separate from the first event, occurring at a second time different from the first time;

determine that the first time is within a specified amount of time from the second time;

apply a convolution window as a matched filter to a series of signals representing extents of co-temporal activity by endpoints connected to a common node during different time slices in a series of time slices;

cause results of the application of the convolution window to produce a filtered series of signals in which a signal-to-noise ratio has been increased relative to the series of signals prior to the application; and in response to determining that the first entity was involved in an event that occurred within the specified amount of time of an event in which the second entity was involved, store information indicative of an existence of an implied relationship between the first entity and the second entity; wherein the instructions to cause the one or more processors to store the information indicative of the existence of the implied relationship, comprise instructions to cause the one or more processors to:

create, in a graph, an first edge connecting a node for the first entity to a node for the second entity;

mark the first edge as being implied rather than real; and modify a weight of the first edge based at least in part on a specified value;

wherein the instructions to cause the one or more processors to modify the weight of the first edge based at least in part on the specified value comprise instructions to cause the one or more processors to increment the weight based at least in part on a temporal distance between the first event and the second event;

wherein the first entity is a first endpoint in a network; wherein the second entity is a second endpoint in the network; wherein the first event is a first transaction in which the first endpoint sent data to a third endpoint different from the first and second endpoints in the network; and wherein the second event is a second transaction in which a fourth endpoint different from the first, second, and third endpoints in the network sent data to the second endpoint.

9. The non-transitory computer-readable storage medium of claim 8, wherein the instructions cause the one or more processors to:

in response to determining that the first event involved both the first endpoint and the third endpoint:

add, to the graph, a second edge connecting a node for the first endpoint to a node for the third endpoint, and mark the second edge as being real rather than implied; and in response to determining that the second event involved both the second endpoint and the fourth endpoint:

add, to the graph, a third edge connecting a node for the second endpoint to a node for the fourth endpoint, and mark the third edge as being real rather than implied.

10. The non-transitory computer-readable storage medium of claim 8, wherein the instructions cause the one or more processors to:

determine that the second entity was involved in a third event, separate from the first and second events, occurring at a third time different from the first and second times;

determine that the third time is within the specified amount of time of the first time; and in response to determining that the second entity was involved in another event that occurred within the specified amount of time of an event in which the first entity was involved, increment the weight of the first edge based at least in part on a temporal distance between the first event and the third event.

11. A non-transitory computer-readable storage medium storing instructions which, when executed by a data processing device, cause the data processing device to:

for each particular event in a set of events:

select, from a set of data buckets, a particular data bucket that is associated with a time range into which a time at which the particular event occurred falls, and insert the particular event into the particular data bucket;

generate a first list that includes each endpoint that is involved in an event that is contained in a data bucket that is associated with a time range that falls into a first specified temporal window;

for each particular endpoint in the first list, increment weights of implied graph edges connecting the particular endpoint to each other endpoint in the first list;

mark graph edges connecting pairs of endpoints that are both involved in a same event as being real rather than implied;

apply a convolution window as a matched filter to a series of signals representing extents of co-temporal activity by endpoints connected to a common node during different time slices in a series of time slices; and use results of the application of the convolution window to produce a filtered series of signals in which a signal-to-noise ratio has been increased relative to the series of signals prior to the application.

12. The non-transitory computer-readable storage medium of claim 11, wherein the instructions cause the one or more processors to:

decrement weights of graph edges that are marked as being real rather than implied; and remove, from a graph, real graph edges that are associated with weights that are below a specified threshold value.

13. The non-transitory computer-readable storage medium of claim 11, wherein the instructions cause the one or more processors to:

generate a second list that includes each endpoint that is involved in an event that is contained in a data bucket that is associated with a time range that falls into a second specified temporal window that partially overlaps the first specified temporal window;

for each particular endpoint in the second list, increment weights of implied graph edges connecting the particular endpoint in the second list to each other endpoint in the second list.

14. The non-transitory computer-readable storage medium of claim 11, wherein the instructions cause the data processing device to:

receive one or more criteria as input;

determine a result set of endpoints that are connected to at least one implied graph edge associated with a weight that satisfies the one or more criteria; and present the result set to an output device.

15. A computer-implemented method comprising:

causing via a data processing device to observe at a common node that is connected to both a first endpoint and a second endpoint, and for each particular time period of a plurality of time periods, an extent of network activity from the first endpoint;

observing, at the common node, and for each particular time period of the plurality of time periods, an extent of network activity from the second endpoint;

based at least in part on the observations relative to the first and second endpoints, determining a convolution of co-temporal activity for each particular time period of the plurality of time periods;

applying via the data processing device a convolution window as a matched filter to a series of signals representing extents of co-temporal activity by endpoints connected to a common node during different time slices in a series of time slices; and causing the data processing device to use results of the application of the convolution window to produce a filtered series of signals in which a signal-to-noise ratio has been increased relative to the series of signals prior to the application; and presenting results of the convolution to an output device.

16. A computer-implemented method comprising:

for each pair of endpoints in a network of endpoints, determining via a data processing device whether activity from both a first endpoint of the pair and activity from a second endpoint of the pair was detected at a common node that is connected to both endpoints in the pair during a particular time period of a plurality of time periods; and for each pair of endpoints in the network of endpoints, causing the data processing device to populate one or more matrix cells corresponding to that pair with a value that is based on whether activity from both of the endpoints in the pair was detected at the common node during the particular time period;

wherein populating the one or more matrix cells comprises:

if activity from both of the endpoints in the pair was detected at the common node during the particular time period, then:

populating, with a first value, a matrix cell at the intersection of a matrix column and row corresponding to the first and second endpoints respectively, and populating, with the first value, a matrix cell at the intersection of a matrix column and row corresponding to the second and first endpoints respectively; and if activity from at least one of the endpoints in the pair was not detected at the common node during the particular time period, then:

populating, with a second value different from the first value, the matrix cell at the intersection of the matrix column and row corresponding to the first and second endpoints respectively, populating, with the second value, the matrix cell at the intersection of the matrix column and row corresponding to the second and first endpoints respectively;

for each particular time slice of a plurality of time slices in the particular time period, setting, in a bit field corresponding to the particular time period, a particular bit corresponding to the particular time slice to a value selected based on whether activity from both of the endpoints in the pair was detected at the common node during the particular time slice; and populating each row of the matrix with a bit field containing bit values representing co-temporal activity between pairs of endpoints during different time slices.

17. A computer-implemented method comprising:

calculating via the data processing device a value that represents an extent to which a common node connected to both a first endpoint and a second endpoint received network traffic from both the first endpoint and the second endpoint during a particular time period;

determining via the data processing device whether the first and second endpoints engaged in a first behavior during the particular time period by applying, to the value, a first pattern filter that is associated with the first behavior; and determining via the data processing device whether the first and second endpoints engaged in a second behavior during the particular time period by applying, to the value, a second pattern filter that is associated with the second behavior;

wherein the first behavior differs from the second behavior; and wherein the first pattern filter differs from the second pattern filter;

in response to determining that the first behavior was involved in an event that occurred within the particular time period of an event in which the second behavior was involved, storing information in non-volatile storage media indicative of an existence of an implied relationship between the first entity and the second entity;

storing the information indicative of the existence of the implied relationship comprising:

creating, in a graph, a first edge connecting a node for the first entity to a node for the second entity;

marking the first edge as being implied rather than real; and modifying a weight of the first edge based at least in part on a specified value.

18. A computer-implemented method comprising:

calculating via a data processing device a series of values that represent extents to which a common node connected to both a first endpoint and a second endpoint received network traffic from both the first endpoint and the second endpoint during time periods in a series of time periods;

applying via the data processing device a discrete Fourier transform to each value in the series of values to produce a series of frequency characteristics;

based at least in part on the series of frequency characteristics, determining via the data processing device an extent to which activity by the first endpoint and activity by the second endpoint was co-temporal during a specified recurring time interval thereby representing an implied relationship;

storing information indicative of existence of the implied relationship, said storing comprises:

creating, in a graph, a first edge connecting a node for the first entity to a node for the second entity;

marking the first edge as being implied rather than real; and modifying a weight of the first edge based at least in part on a specified value wherein modifying the weight of the first edge based at least in part on the specified value comprises incrementing the weight based at least in part on a temporal distance between the first event and the second event; and presenting at least said extent to an output device.

19. The computer-implemented method of claim 18, wherein the specified recurring time interval is one of: weekly, monthly, day-of-the-weekly, or end-of-monthly.

* * * * *